(12) United States Patent
Ryabinin et al.

(10) Patent No.: US 8,997,972 B2
(45) Date of Patent: Apr. 7, 2015

(54) SYSTEMS AND METHODS FOR TRANSFERRING ITEMS OVER TRANSITION GAP BETWEEN CONVEYOR SECTIONS OF AUTOMATED CHECKOUT SYSTEM

(71) Applicant: Datalogic ADC, Inc., Eugene, OR (US)

(72) Inventors: Stepan Ryabinin, Portland, OR (US); Jeffrey J. Hoskinson, Eugene, OR (US); Paul R. Huss, Eugene, OR (US); Michael P. Svetal, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 47 days.

(21) Appl. No.: 13/834,408

(22) Filed: Mar. 15, 2013

(65) Prior Publication Data

US 2014/0102856 A1   Apr. 17, 2014

Related U.S. Application Data

(60) Provisional application No. 61/676,845, filed on Jul. 27, 2012.

(51) Int. Cl.
*B65G 43/08* (2006.01)
*G06K 7/10* (2006.01)
*A47F 9/04* (2006.01)

(52) U.S. Cl.
CPC ............ *B65G 43/08* (2013.01); *G06K 7/10861* (2013.01); *G06K 7/10871* (2013.01)

(58) Field of Classification Search
CPC ........................... B65G 43/08; B65G 235/479
USPC ................................ 198/502.1, 600; 235/440
See application file for complete search history.

(56) References Cited

U.S. PATENT DOCUMENTS

| | | | |
|---|---|---|---|
| 2,536,961 | A | 1/1951 | Smith et al. |
| 2,569,711 | A | 10/1951 | Foster et al. |
| 2,812,051 | A | 11/1957 | Duckro et al. |

(Continued)

FOREIGN PATENT DOCUMENTS

| | | |
|---|---|---|
| EP | 1286296 | 2/2003 |
| KR | 20-1999-0006240 | 2/1999 |
| KR | 10-1999-0058154 | 7/1999 |

OTHER PUBLICATIONS

Korean Intellectual Property Office, International Search Report and Written Opinion, International Patent Application No. PCT/US2013/046263, dated Sep. 27, 2013, 9 pages.

*Primary Examiner* — Gene Crawford
*Assistant Examiner* — Thomas Randazzo
(74) *Attorney, Agent, or Firm* — Stoel Rives LLP

(57) ABSTRACT

An automated checkout system for reading optical data, such as barcode labels, on a bottom surface of an item using a data reader. The automated checkout system includes a housing supporting a leading conveyor section and a trailing conveyor section separated by a gap. The housing movably supports a transition element positioned across the gap for helping items transition between the conveyor sections. The transition element is movable between a first position and a second position. A sensor is in communication with the transition element and is configured to sense the position of the transition element, where movement of the transition element from the first position to the second position activates the sensor. When activated, the sensor may send a signal to a terminal to display a warning message to a user. Alternatively, the sensor may send a signal to an automatic shut-off mechanism to stop operation of the conveyors.

18 Claims, 15 Drawing Sheets

(56) References Cited

U.S. PATENT DOCUMENTS

| | | |
|---|---|---|
| 3,548,996 A | 12/1970 | Lancaster |
| 3,949,194 A | 4/1976 | Catto et al. |
| 3,978,317 A | 8/1976 | Yamaguchi et al. |
| 5,250,989 A | 10/1993 | Fukuchi et al. |
| 5,252,814 A * | 10/1993 | Tooley ............ 235/383 |
| 5,410,296 A * | 4/1995 | Montbriand et al. ......... 335/284 |
| 5,984,186 A | 11/1999 | Tafoya |
| 6,142,376 A | 11/2000 | Cherry et al. |
| 6,220,911 B1 | 4/2001 | Kim |
| 6,761,391 B2 * | 7/2004 | Winkler ............ 296/79 |
| 6,817,610 B2 | 11/2004 | Rompe |
| 7,648,020 B2 * | 1/2010 | Dickover et al. ............ 198/600 |
| 8,356,749 B2 * | 1/2013 | Olmstead et al. ............ 235/383 |
| 8,423,180 B1 * | 4/2013 | Frederick et al. ............ 700/236 |
| 2004/0108851 A1 * | 6/2004 | Fourcade et al. ......... 324/207.17 |
| 2005/0062296 A1 * | 3/2005 | Lyon ............ 292/251.5 |
| 2010/0230247 A1 | 9/2010 | McKee |
| 2012/0085626 A1 | 4/2012 | Vlug |
| 2012/0187191 A1 | 7/2012 | Olmstead |
| 2012/0187194 A1 | 7/2012 | Svetal et al. |
| 2012/0187195 A1 * | 7/2012 | Actis et al. ............ 235/479 |
| 2012/0205448 A1 * | 8/2012 | Hoskinson et al. ............ 235/440 |
| 2012/0277904 A1 * | 11/2012 | Pritchard et al. ............ 700/232 |
| 2013/0020392 A1 * | 1/2013 | Olmstead et al. ............ 235/440 |

* cited by examiner

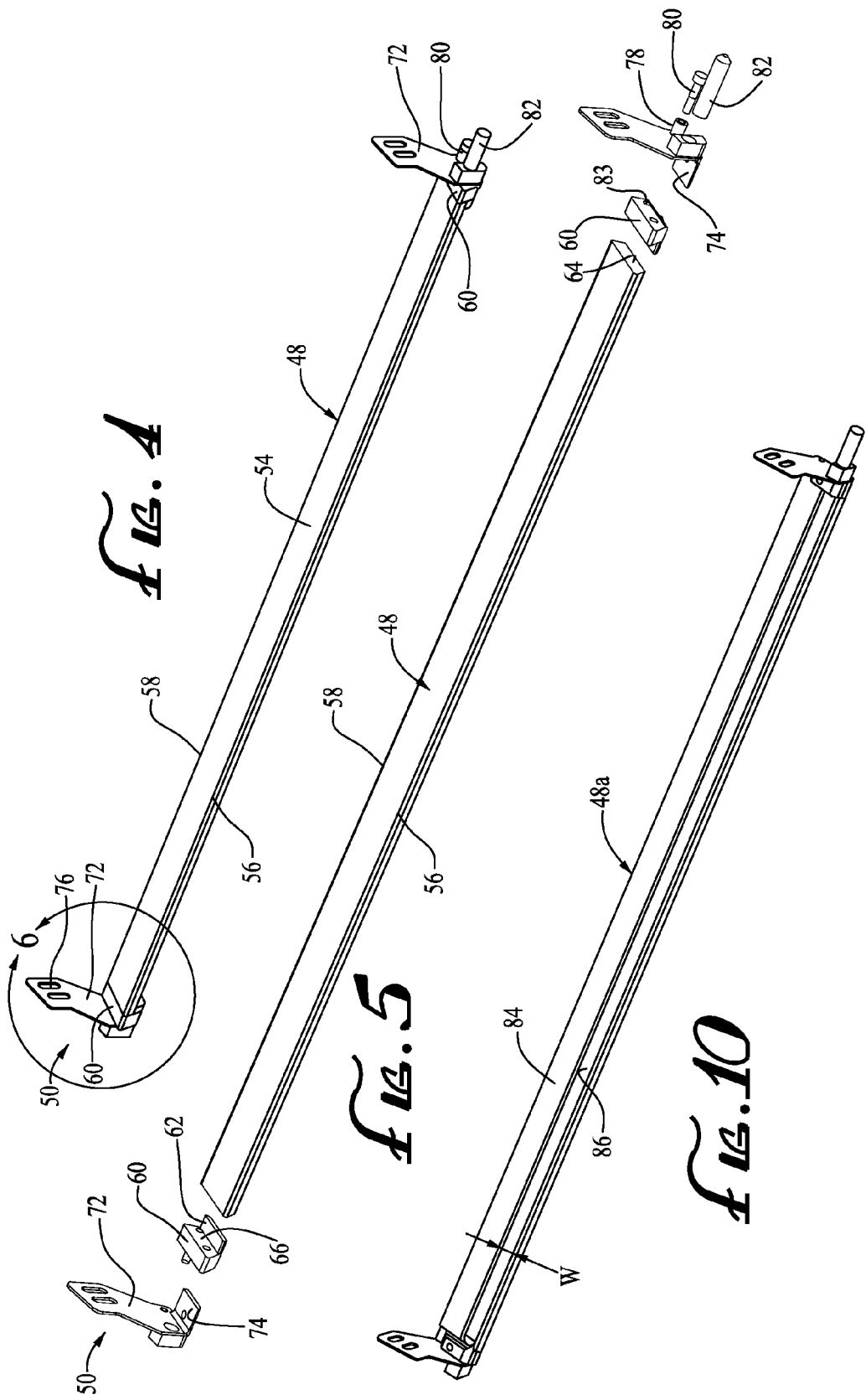

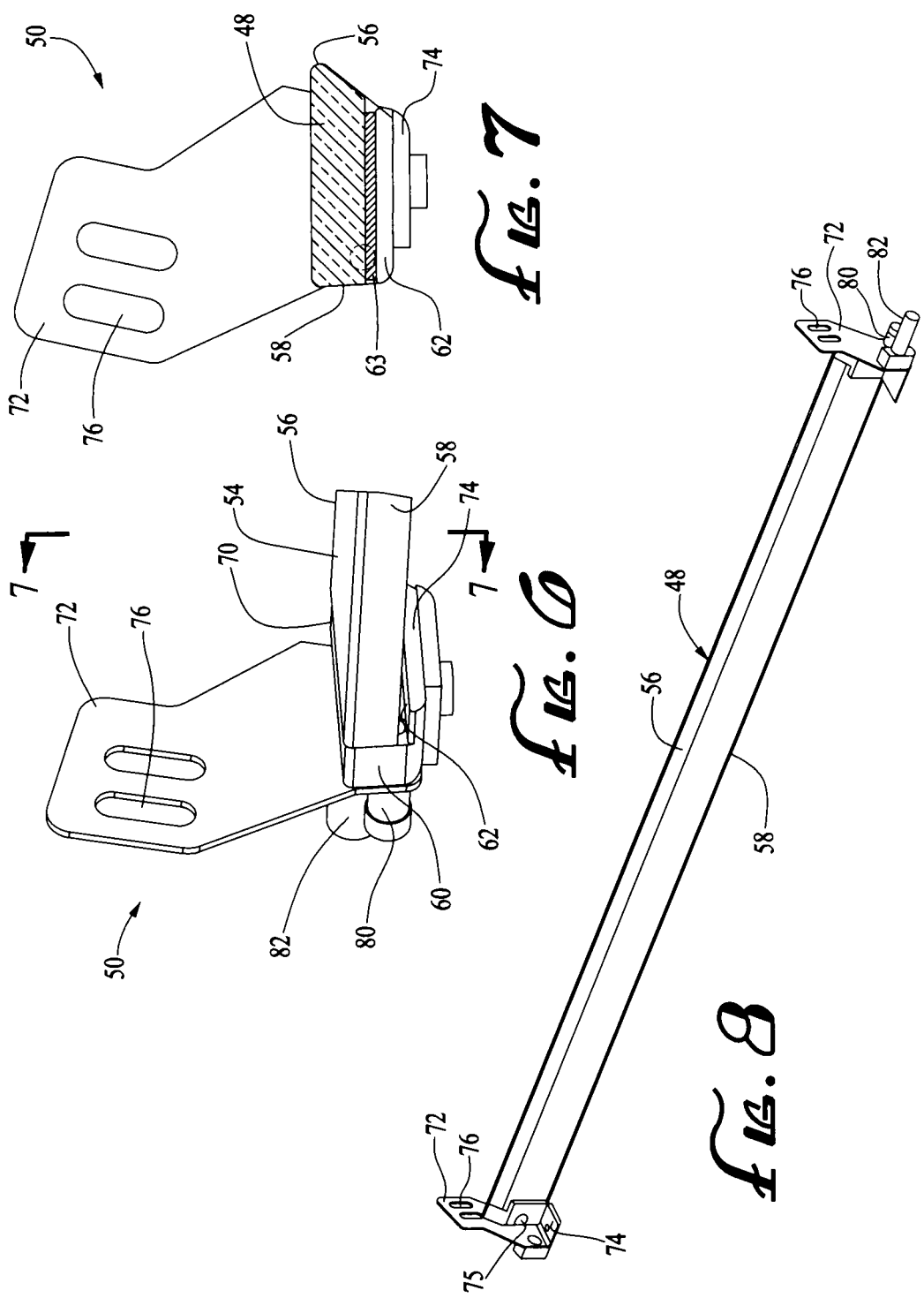

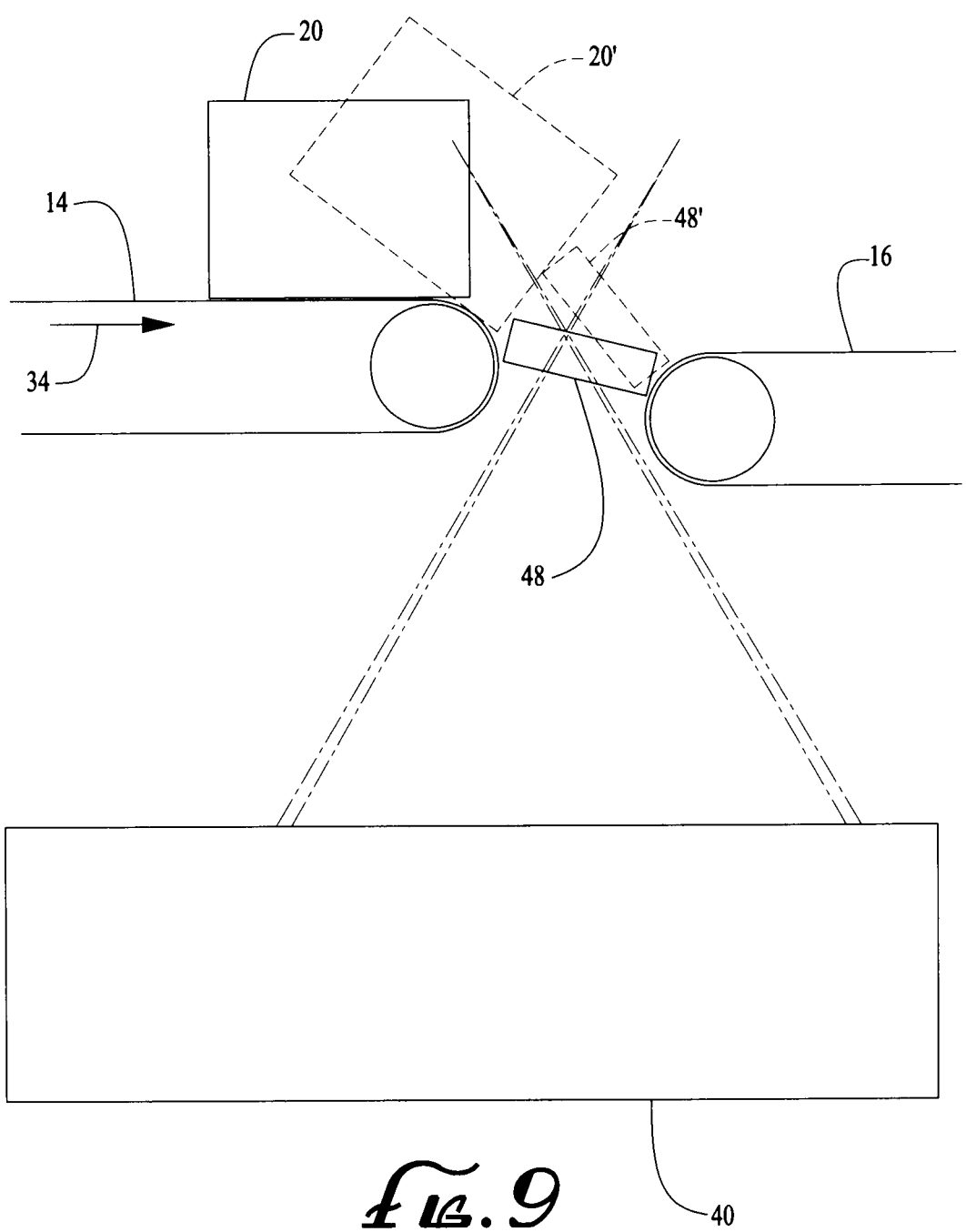

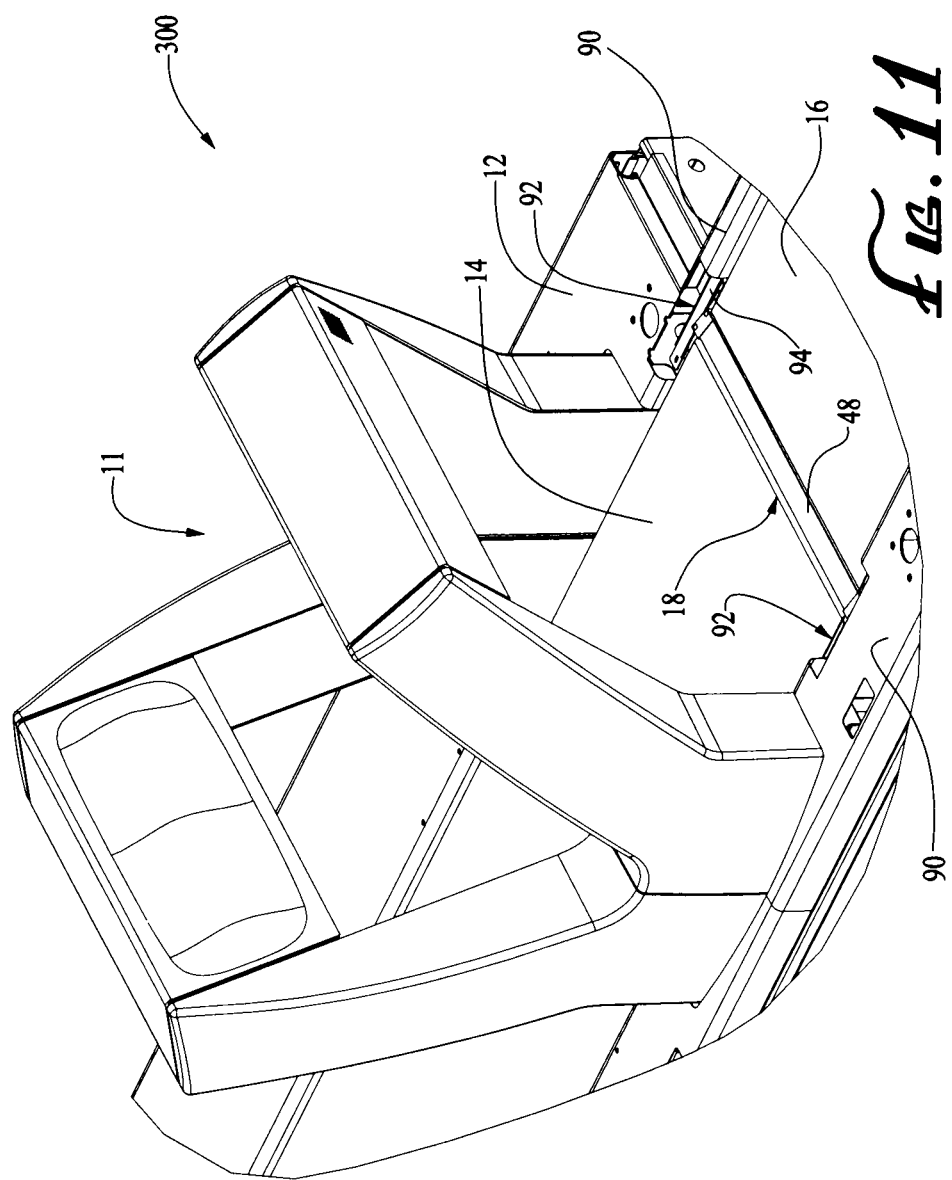

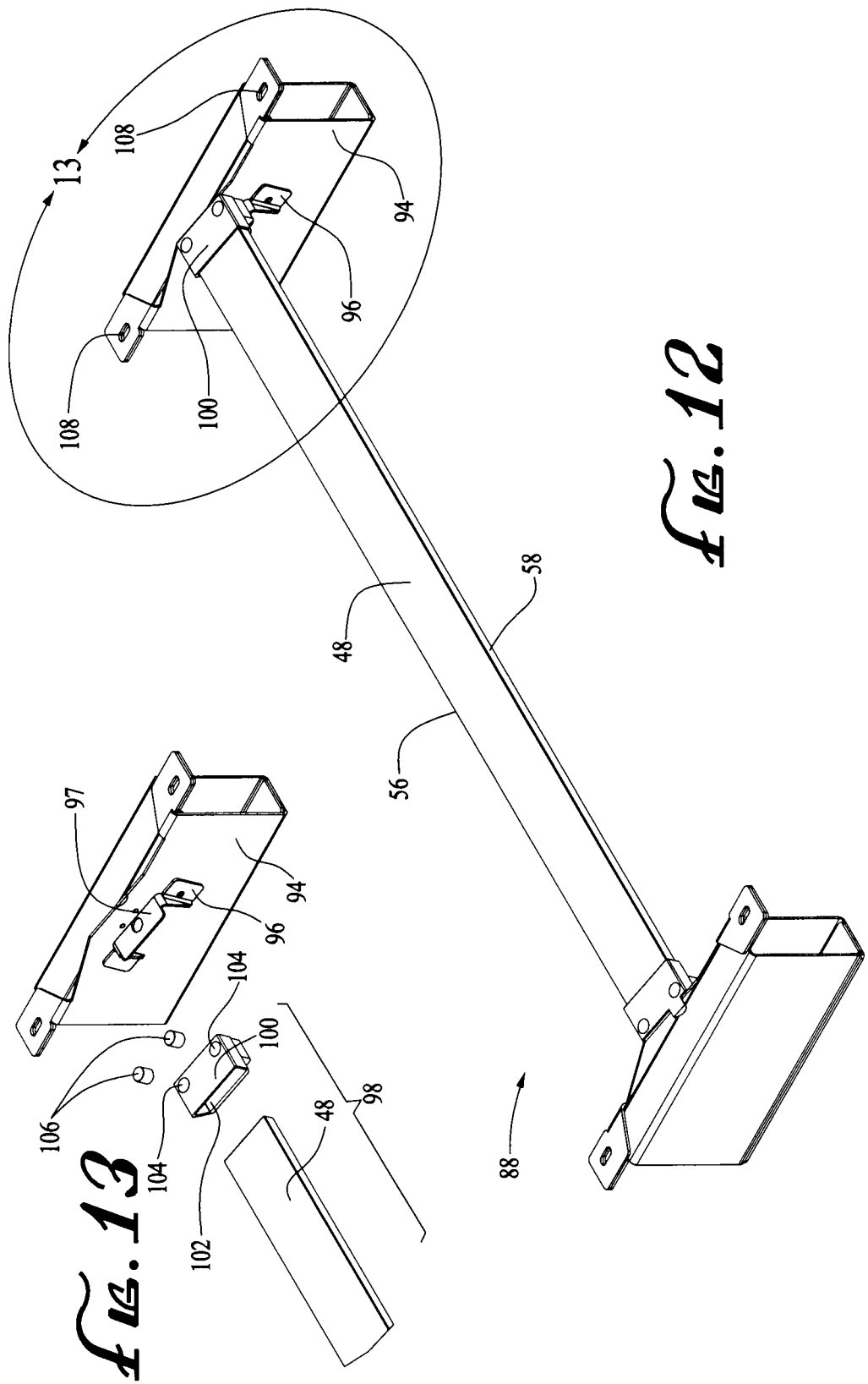

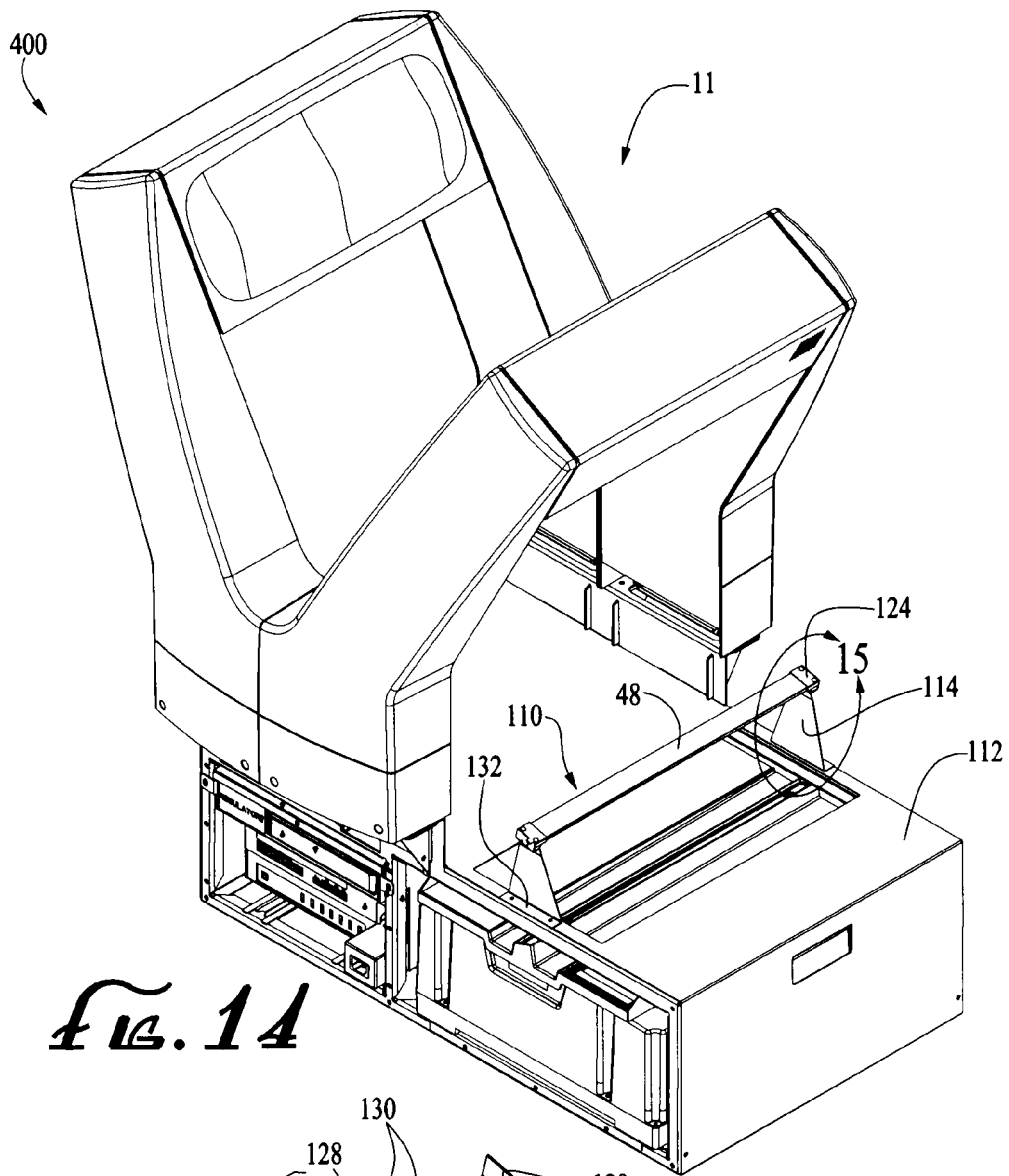
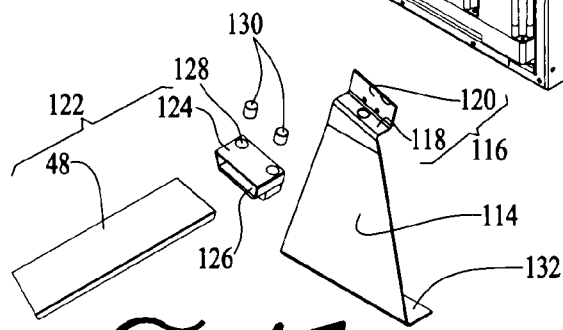

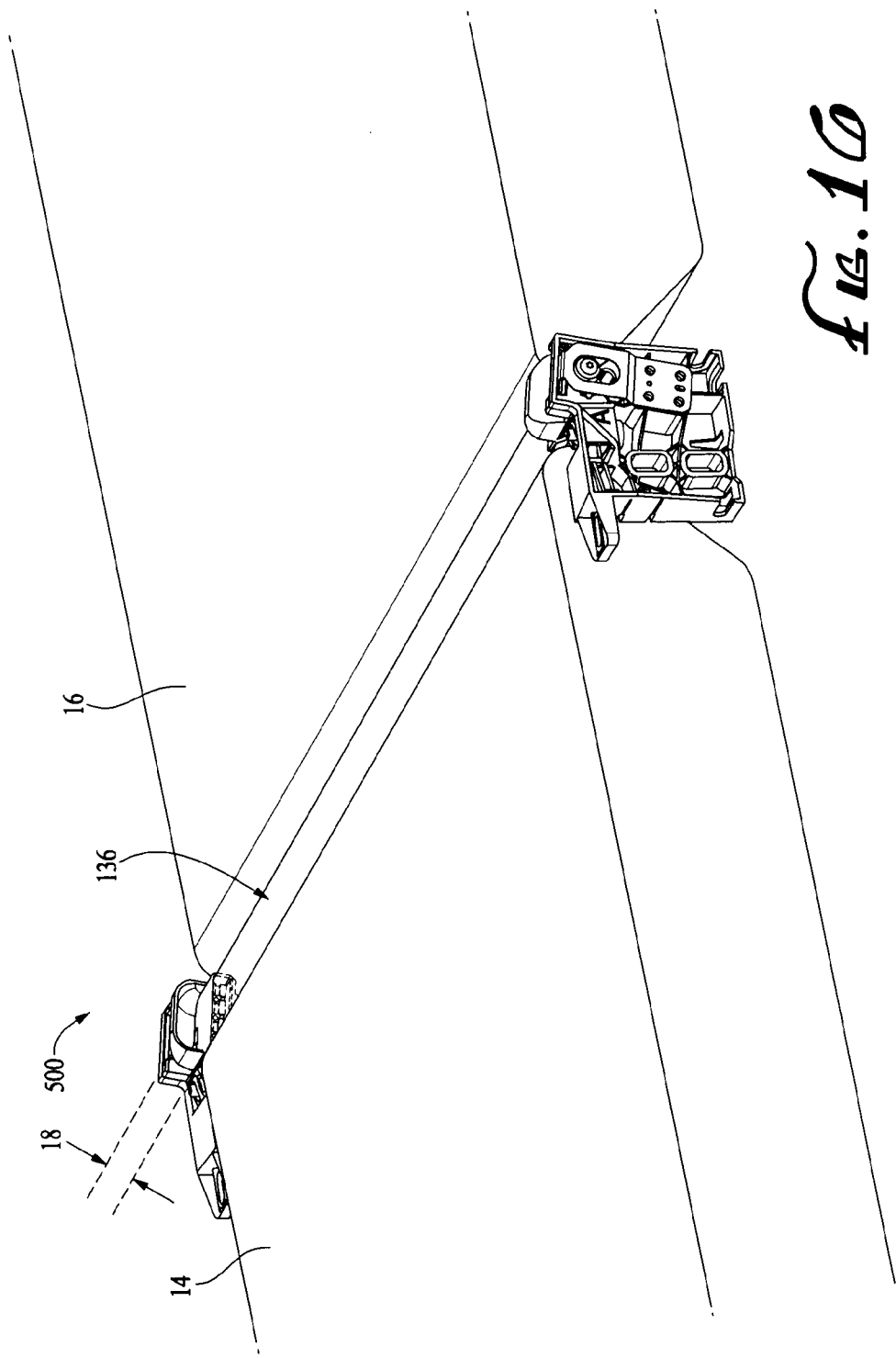

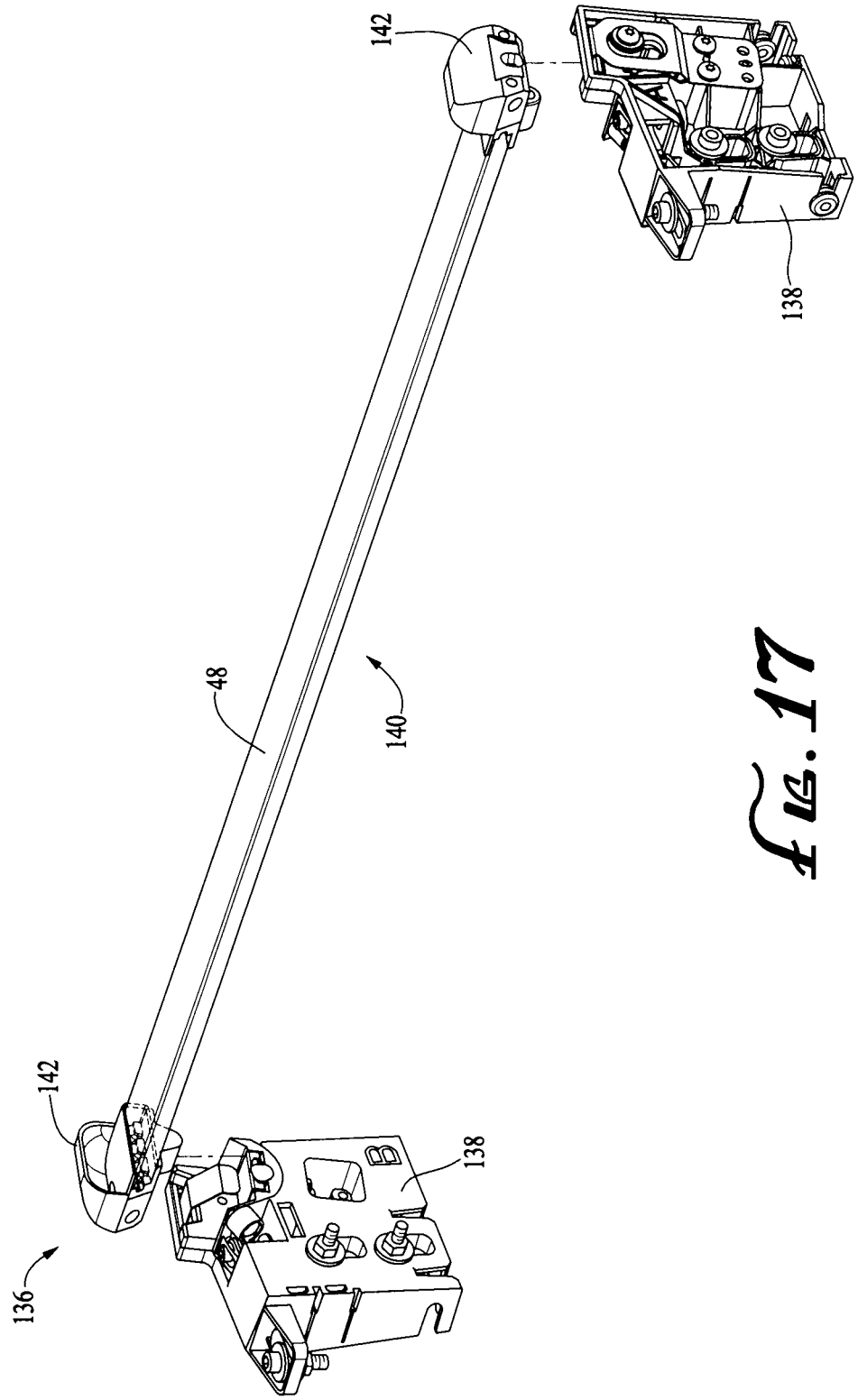

SYSTEMS AND METHODS FOR TRANSFERRING ITEMS OVER TRANSITION GAP BETWEEN CONVEYOR SECTIONS OF AUTOMATED CHECKOUT SYSTEM

RELATED APPLICATIONS DATA

This application claims the benefit under 35 U.S.C. §119(e) from U.S. Provisional Application No. 61/676,845, filed Jul. 27, 2012, titled "Systems and Methods for Transferring Items Over Transition Gap Between Conveyor Sections of Automated Checkout System", the disclosure of which is incorporated herein by reference.

BACKGROUND

The field of this disclosure relates generally to automated checkout systems and methods of operation, and more particularly, to automated checkout systems with mechanisms for aiding in transferring items across conveyor sections.

Data reading systems are used to read optical codes, acquire data, and capture a variety of images. Data reading devices are well known for reading UPC and other types of optical codes on packages, particularly in retail stores. One common data reader in such systems is an imaging reader that employs an imaging device or sensor array, such as a CCD (charge coupled device) or CMOS (complementary metal oxide semiconductor) device. Imaging readers can be configured to read both 1-D and 2-D optical codes, as well as other types of optical codes or symbols and capture images of other items. Though some imaging readers are capable of using ambient light illumination, an imaging reader typically utilizes a light source to illuminate the item being read to provide the required signal response in the imaging device. An imager-based reader utilizes a camera or imager to generate electronic image data, typically in digital form, of an optical code. The image data is then processed to find and decode the optical code.

In a typical retail establishment, such data reading devices are installed at checkout stands or are built into a horizontal checkout counter so that a scan pattern is projected through a transparent window to read the barcode on the package. Normally, a customer places packages on a counter, a deck, or a conveyor. In a semi-automatic system, a checkout clerk then takes each package and moves the package through the scanner's read region to capture the optical code. In an automated system (e.g., a portal or tunnel scanner), the package is transported, such as via a conveyor, through the scanner's read region and the optical code is captured as the package passes through the read region.

Some data capturing systems may include one or more discrete subsystems (e.g., optical data readers, such as imaging readers and flying spot laser scanners, and RFID readers) arranged to scan and read optical codes located on the outward-facing surfaces of the item or read RFID tags either on or inside the item. Automated checkout systems typically include a moving conveyor and a data capturing system, where the moving conveyor transports an item having a barcode through the data capturing system, which scans the surfaces of the item and captures the barcode. In some arrangements, the automated checkout system may include a pair of moving conveyors separated by a gap through which a bottom data reader may capture optical codes located on a bottom surface of the item when the item moves across the gap. The moving conveyors thereafter transport the item to a downstream area, which, in the case of a retail checkout application, may constitute a bagging area where the scanned/purchased items can be gathered and bagged.

The present inventors have recognized a need for a transition element positioned across the gap for helping the items cross the gap while still allowing the bottom data reader to capture the optical code. The present inventors have also recognized a need for a transition element mounting assembly that reduces interference with the field of view of the bottom data reader. The present inventors have, therefore, determined that it would be desirable to provide a data reading system with improved features and functionality.

Additional aspects and advantages will be apparent from the following detailed description of preferred embodiments, which proceeds with reference to the accompanying drawings. The drawings depict only certain preferred embodiments and are not to be considered as limiting in nature.

BRIEF DESCRIPTION OF THE DRAWINGS

FIG. 2A is a perspective view of a portion of FIG. 2 on an enlarged scale.

FIG. 4 is a perspective view of a transition plate assembly of FIG. 2 according to one embodiment.

FIG. 5 is an exploded view of the transition plate assembly of FIG. 4.

FIG. 6 is a perspective view of a portion of the transition plate assembly of FIG. 4 on an enlarged scale.

FIG. 7 is a cross-sectional view taken along line 7-7 of the transition plate assembly of FIG. 6.

FIG. 8 illustrates a perspective view of the transition plate assembly of FIG. 4 in a breakaway position.

FIG. 9 is a simplified schematic diagram of the automated checkout system illustrating the transition plate moving between an operational position and a breakaway position.

FIG. 10 illustrates a transition plate with a slotted aperture according to another embodiment.

FIG. 11 is a view of a portion of an automated checkout system having a transition plate assembly according to a second embodiment.

FIG. 12 is a perspective view of the transition plate assembly of FIG. 11.

FIG. 13 is an exploded view of a portion of the transition plate assembly of FIG. 11 on an enlarged scale.

FIG. 14 is a perspective view of a portion of an automated checkout system (illustrated without the conveyors and other components) with a transition plate assembly attached to a subassembly of the automated checkout system according to a third embodiment.

FIG. 15 is an exploded view of a portion of the transition plate assembly of FIG. 14.

FIG. 16 is a view of a portion of an automated checkout system having a transition plate assembly according to a fourth embodiment.

FIG. 17 is a partially exploded view of the transition plate assembly of FIG.

DETAILED DESCRIPTION OF EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

In the following description of the figures and any example embodiments, it should be understood that an automated checkout system in a retail establishment is merely one use for such a system and should not be considered as limiting. An automated checkout system with the characteristics and features described herein can alternatively be used, for example, in an industrial location such as a parcel distribution center (e.g., postal), warehouse, or luggage distribution center.

Figure 1:
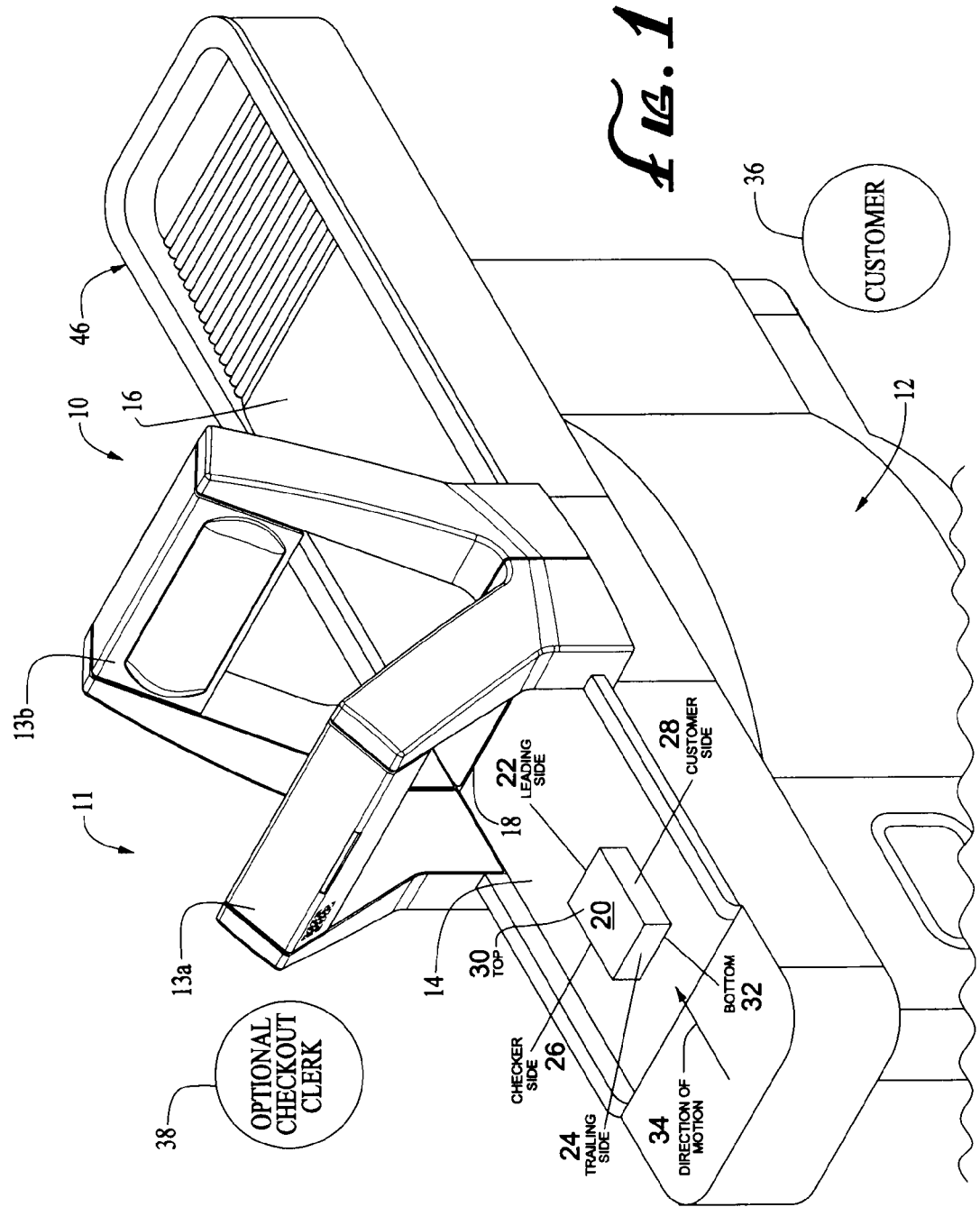
FIG. 1 is an isometric view of an automated checkout system according to a first embodiment.
Figure 2:
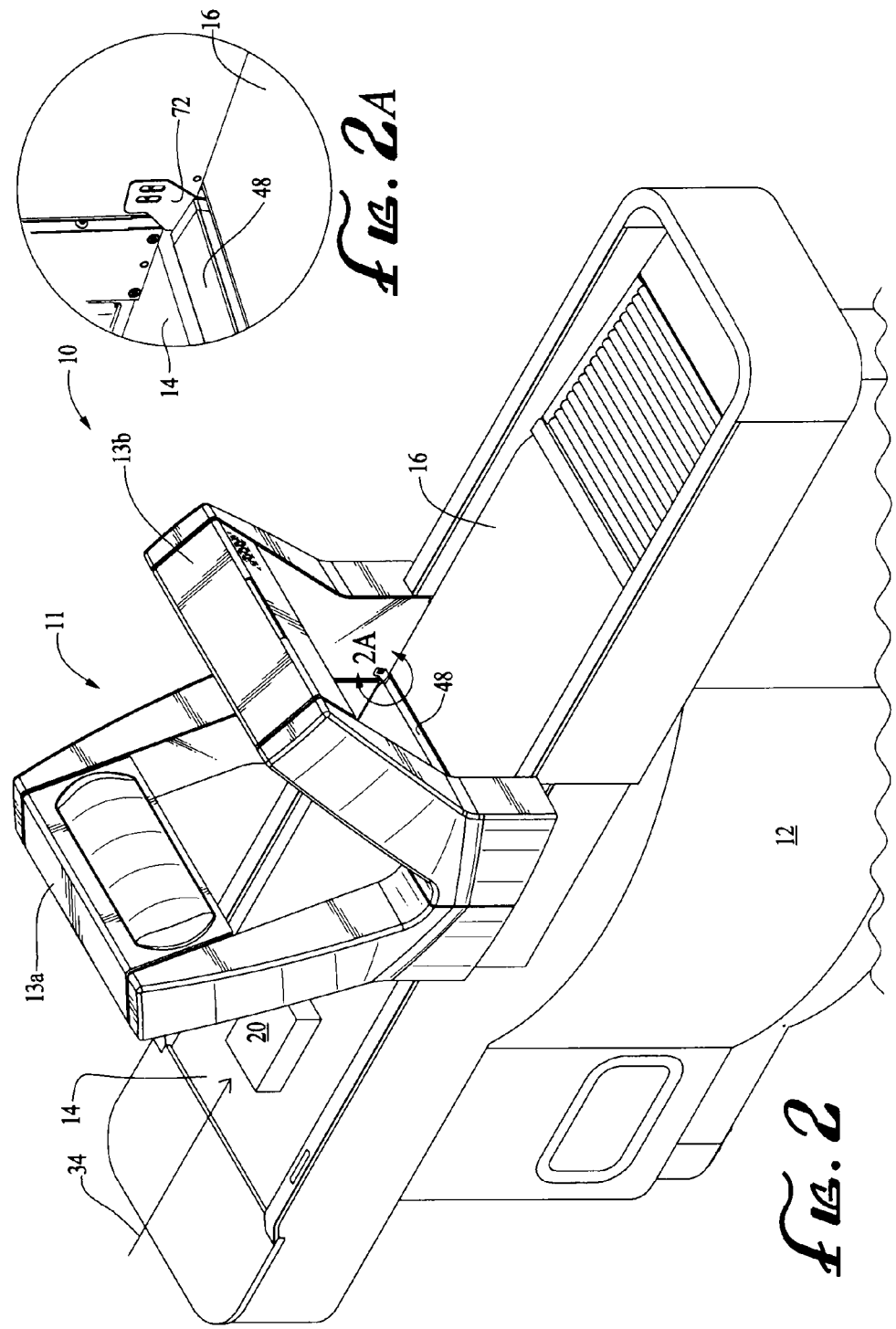
FIG. 2 is an isometric view of an automated checkout system according to a second embodiment, with a transition plate positioned between the conveyor sections.
Figure 3:
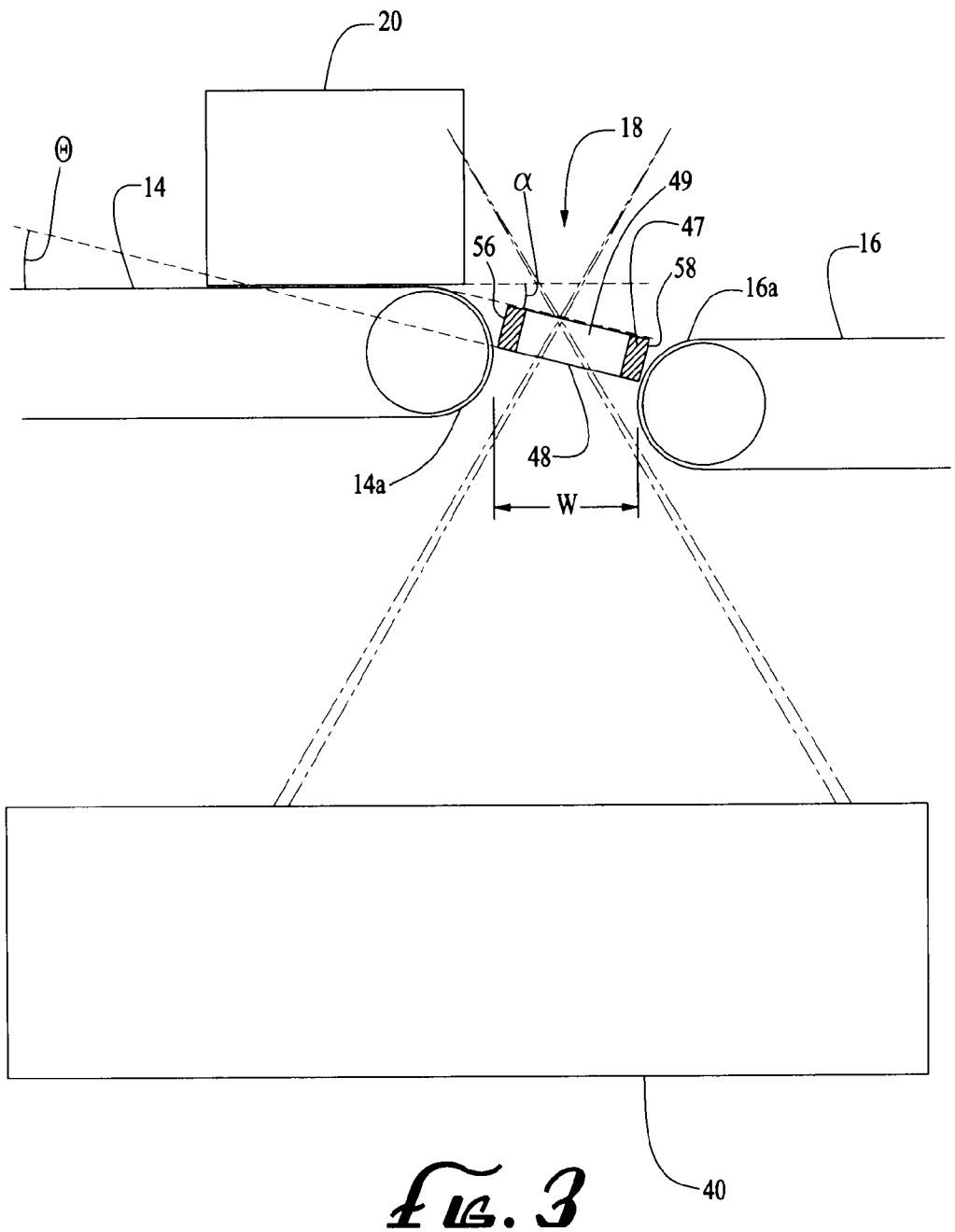
FIG. 3 is a simplified schematic diagram of the automated checkout system of FIG. 2 illustrating the transition plate between the conveyors and a data reader positioned beneath the conveyors.

FIGS. 1-3 collectively illustrate an automated checkout system 10 that may be used to read and process an optical code on a bottom surface 32 of an item 20 during a checkout process, such as in a retail establishment (e.g., a supermarket) or an industrial location (e.g., a luggage distribution center). In an example operation, a customer 36 or clerk 38 (hereinafter, collectively referred to as a "user") places item 20 onto a leading conveyor section (or conveyor) 14, which transports item 20 in a substantially linear direction of motion 34 toward a trailing conveyor section (or conveyor) 16. Conveyor sections 14, 16 are spaced apart by a gap 18, which is elongated in one direction and oriented generally transverse to the substantially linear direction of motion 34 of item 20. Depending on the size of gap 18 and the dimensions of item 20, transition between conveyor sections 14, 16 may be difficult for some items, as they may become lodged or perhaps fall through gap 18. Accordingly, to help item 20 transition between conveyor sections 14, 16, automated checkout system 10 further includes a transition element or plate 48 positioned at least partially across gap 18. Further details and advantages associated with transition plate 48 are described below with particular reference to FIGS. 4-15.

As item 20 transitions across gap 18, the optical code on bottom surface 32 of item 20 is exposed to a data reader 40 that is positioned below conveyor sections 14, 16. Data reader 40 is oriented to project a field of view through gap 18 and transition plate 48 to capture the optical code as item 20 slides across transition plate 48. Item 20 may thereafter be transported on trailing conveyor section 16 to a bagging area 46, where the user or other person can bag item 20. Further details of an example portal scanner, including a bottom data reader, are disclosed in U.S. application Ser. No. 13/357,356, filed Jan. 24, 2012, the disclosure of which is hereby incorporated by reference.

With reference to FIGS. 2-3, in one embodiment, automated checkout system 10 includes a housing or counter structure 12 suitable for containing various components of automated checkout system 10. Automated checkout system 10 may include a data capture device 11 having a first arch 13a and a second arch 13b attached to housing structure 12. First and second arches 13a, 13b may include one or more data readers positioned therein for capturing optical code labels or other information from item 20.

Preferably, conveyor sections 14, 16 are oriented and configured to transport item 20, represented as a six-sided, box-shaped package having a leading side 22, a trailing side 24, a checker side 26, a customer side 28, a top surface 30, and a bottom surface 32, through automated checkout system 10 in a substantially linear direction of motion 34. The description regarding checker side 26 and customer side 28 is meant to establish a relative frame of reference and facilitate description related to the position of customer 36 and checkout clerk 38 as illustrated in FIG. 1. It should be understood that automated checkout system 10 may be used without a checkout clerk 38, and customer 36 may be positioned at either side of automated checkout system 10. For convenience, item 20 is described as a box-shaped package, but it should be understood that item 20 may encompass other shapes, including irregularly shaped packages, such as a bag of oranges, potato chips, or the like. Additionally, although item 20 may contain an optical code on any one or more of the six sides 22, 24, 26, 28, 30, and 32 described herein, for purposes of discussion, the optical code will be described with reference to its location on a conveyor-contacting bottom surface 32 of item 20.

In some embodiments, conveyor sections 14, 16 may be disposed in a vertically offset configuration in relation to one another, as best shown in FIG. 3. For instance, conveyor sections 14, 16 may be arranged with leading conveyor section 14 being slightly raised (i.e., the leading conveyor terminating at a slightly raised elevation proximate and relative to the trailing conveyor) in relation to trailing conveyor section 16. In this configuration, when item 20 transitions between leading conveyor section 14 to trailing conveyor section 16, item 20 crosses gap 18 and tilts or drops slightly onto trailing conveyor section 16. Conveyor sections 14, 16, may be vertically offset on the order of a few millimeters or more to create a step down between leading conveyor section 14 and trailing conveyor section 16 at an angle of inclination Θ between a range of 10 to 20 degrees (see FIG. 3). In other embodiments, the angle of inclination Θ between conveyor sections 14, 16 may be smaller or larger than the provided range and may depend on a number of factors, such as the arrangement and available space for automated checkout system 10. In still other embodiments, conveyor sections 14, 16 may instead be positioned along the same plane (i.e., they may be in a co-planar arrangement) in a substantially longitudinal axis and oriented such that item 20 travels in a substantially linear direction of motion 34.

In another embodiment, conveyor sections 14, 16 may have a different directional orientation, such as a semi-circular configuration wrapping around customer 36 or checkout clerk 38. In such a configuration, conveyor sections 14, 16 may each have a curved portion and a straightened portion, where the straightened portion of leading conveyor 14 is substantially aligned with the straightened portion of trailing conveyor 16 and the respective straightened portions of conveyor sections 14, 16 are separated by gap 18. The operation regarding the processing and reading of item 20 in these alternate configurations may be substantially the same as described with respect to an embodiment where conveyor sections 14, 16 are disposed in a horizontal orientation along a substantially longitudinal axis. Accordingly, it should be understood that the arrangement of conveyor sections 14, 16 shown in the figures is for illustration purposes only and not intended to be limiting.

As mentioned previously, conveyor section 14, 16 are separated by a gap 18 of suitable width. In some embodiments, the width of gap 18 may depend on many factors, such as, the intended use of automated checkout system 10 and/or performance characteristics of data reader 40. For instance, a retail establishment that processes items of various small sizes may want to keep the gap 18 width fairly narrow (e.g., on the order of 10 to 35 millimeters or so) to accommodate thinner or smaller items, such as gum packages, gift cards, or greeting cards, and thus inhibit those items from becoming lodged in or falling through gap 18. A warehouse, on the other hand, dealing primarily with larger packages can have a larger width for gap 18 (e.g., on the order of 35 millimeters or more) without concern that the packages may fall through or become lodged. In some embodiments, a width of gap 18 of at least 29 millimeters or so may suitably accommodate a variety of uses for automated checkout system 10 while still providing a sufficiently large read region to allow for optimal performance of data reader 40. It should be understood that the width dimensions of gap 18 may be selected as needed for a particular application and/or to accommodate a variety of data readers.

In some embodiments, gap 18 may be positioned at any location along conveyor sections 14, 16, such as at a substantially central location between first arch 13a and second arch 13b as shown in FIG. 1. In other embodiments, gap 18 may be positioned upstream in relation to first arch 13a (i.e., a position where item 20 first crosses gap 18 and thereafter passes through arches 13a, 13b of data capture device 11) or downstream in relation to second arch 13b (i.e., a position where item 20 first passes through arches 13a, 13b of data capture device 11 and thereafter crosses gap 18 as illustrated in FIG. 11. Further details and advantages of such embodiments are disclosed in U.S. application Ser. No. 13/357,459, filed Jan. 24, 2012, the disclosure of which is hereby incorporated by reference.

Automated checkout system 10 further includes a data reader 40 positioned below conveyor sections 14, 16 and housed within housing structure 12. It should be understood that the following is a simplified description of certain components of data reader 40 and may not include explicit details relating to a particular arrangement of optical elements, mirror sets, and other related features. Data reader 40 may include any desired arrangement for such components as desired. For instance, in some embodiments, data reader 40 may include an optical arrangement and other features as described in U.S. patent application Ser. No. 13/357,356, filed Jan. 24, 2012, the disclosure of which is hereby incorporated by reference. Data reader 40 may include one or more cameras to acquire the optical code on item 20 as it crosses gap 18. In one configuration, components of data reader 40 may be constructed and arranged in a pull-out drawer sub-housing, such as described in U.S. application Ser. No. 13/454,377, filed Apr. 24, 2012, the disclosure of which is hereby incorporated by reference.

Preferably, conveyor sections 14, 16 operate at a constant speed, for example, at approximately 300 mm/s, to help optimize the performance of data reader 40. It should be noted that in other embodiments, however, optimal performance of data reader 40 may be achieved with conveyor sections 14, 16 operating at other suitable speeds higher or lower than 300 mm/s.

FIG. 3 is a schematic diagram of automated checkout system 10 with vertically offset conveyor sections 14, 16, and a transition plate 48 positioned across gap 18 for helping item 20 transition between conveyor sections 14, 16. As mentioned previously, depending on the size of gap 18 and the dimensions of item 20, transition between conveyor sections 14, 16 may be difficult for some items. For instance, the curvature at respective edges 14a, 16a of conveyor sections 14, 16 may lead to some items 20 falling through gap 18. Transition plate 48 helps prevent items 20 from becoming lodged in or perhaps falling through gap 18.

Preferably, gap 18 has a width W of approximately 29-30 mm and conveyors 14, 16 are offset at an angle $\Theta$ measuring between 10 and 20 degrees. In such a configuration, transition plate 48 may be positioned between conveyor sections 14, 16 on a downward tilt at an angle $\alpha$ ranging from between 10 and 20 degrees, preferably at an angle $\alpha$ measuring between 13 and 15 degrees to optimize performance of data reader 40. Because of its angular orientation between conveyor sections 14, 16, transition plate 48 may have a width of approximately 29-30 mm (substantially equal to the width of gap 18) while still leaving a narrow clearance (on the order of 2-3 mm) between transition plate 48 and each of respective edges 14a, 16a so as to avoid interfering with the operation of conveyor sections 14, 16. In some configurations, the clearance may be larger than 2-3 mm, but it is preferably kept to a minimum distance to avoid having items 20 become lodged or trapped between leading conveyor section 14 and transition plate 48. Aside from this relatively small clearance, the transition plate 48 preferably spans the entire width of gap 18. In other embodiments, the ranges of the provided distances and angles may be selected as needed for a specific application, configuration of an automated checkout stand, and/or to accommodate performance characteristics of a particular data reader.

FIGS. 4-9 illustrate an example embodiment of a transition plate assembly 50 that may be used to mount and support transition plate 48 in automated checkout system 10. With particular reference to FIG. 4, transition plate 48 includes a substantially planar top surface 54, a leading edge 56, and an opposing trailing edge 58. Transition plate 48 may be comprised of a substantially transparent material, such as glass or plastic, so that data reader 40 can scan through transition plate 48 and read the optical code on bottom surface 32 of item 20. In some embodiments, a border 47 (see FIG. 3) of transition plate 48 may be comprised of a protective material (such as metal) or comprised of a wear/skid surface, (such as a plastic or PTFE material) which may be transparent or non-transparent. Border 47 may include one or both of leading and trailing edges 56, 58 of transition plate 48 and may help prevent leading and trailing edges 56, 58 from becoming damaged by contact with items 20 as they move across transition plate 48. In such an arrangement, a central portion 49 of transition plate 48 is transparent and data reader 40 reads the optical code of the item 20 as it passes across central portion 49 of transition plate 48. While data reader 40 may not be able to read through exterior border 47, central portion 49 provides a large enough read region through which bottom data reader 40 may read the optical code on passing items 20.

In an example operation, item 20 is transported on leading conveyor section 14 toward gap 18 and data reader 40. Prior to crossing gap 18, item 20 first contacts leading edge 56 of transition plate 48 and transitions onto transition plate 48 and moves across top surface 54. As item 20 slides across top surface 54, the optical code label on bottom surface 32 is visually exposed to, and captured by, data reader 40 through gap 18 and/or through transition plate 48. Thereafter, item 20 transitions off transition plate 48 near the trailing edge 58 and onto trailing conveyor section 16, where item 20 may then be transported to bagging area 46.

FIGS. 4-7 illustrate detailed views of transition plate 48 and transition plate assembly 50. Transition plate assembly 50 includes a pair of end caps 60, each having an end cap flange 62 extending or protruding outwardly therefrom to form a generally L-shaped structure. End cap flange 62 is preferably substantially planar and supports transition plate 48 when transition plate assembly 50 is assembled. End caps 60 may be molded, such as via a die casting process, from aluminum, copper, tin, or other durable metal or material to help provide a sturdier support system for transition plate 48.

In one embodiment, a wall 64 of transition plate 48 may be adhered to or bonded with a wall 66 of end cap 60 (see FIG. 5), with transition plate 48 resting against end cap flange 62. In another arrangement, transition plate 48 may not sit flush against end cap flange 62 but may instead be positioned above end cap flange 62 (as best shown in FIG. 6) when end cap 60 is bonded with the transition plate 48. To fill the void between end cap flange 62 and transition plate 48, a layer 63 of glue or other adhesive substance may be used to adhere and support transition plate 48 on end cap 60 (see FIG. 7). The glue/adhesive layer 63 is preferably of a thickness that would result in top surface 54 of transition plate 48 being substantially flush with a top surface 70 of end cap 60.

In other embodiments, other suitable attachment mechanisms may be used to secure end caps 60 with transition plate 48. For instance, transition plate 48 and end caps 60 may include bores sized to receive screws, pins, nails, or other attachment means for securing transition plate 48 in end caps 60. In still other embodiments, other suitable attachment means may be used.

Transition plate assembly 50 further includes a pair of base mounts 72 each having a flange 74 extending or protruding outwardly therefrom. Flange 74 is sized and dimensioned to support end cap 60 and end cap flange 62 when transition plate assembly 50 is in an assembled configuration. Flange 74 includes one or more magnets 75 to detachably support end cap 60 and transition plate 48 (see FIG. 8). Base mounts 72 further includes a sleeve or tube 78 sized and dimensioned to receive a pivot pin 80. Each of end caps 60 also includes a corresponding aperture 83 with a matching diameter to pivot pin 80 to receive pivot pin 80 therein. When fully assembled, end cap 60 rests on flange 74 and is secured thereto by the one or more magnets 75. Pivot pin 80 slides through sleeve 78 on base mounts 72 and through aperture 83 to rotatably secure end caps 60 and mounting plate 48. Additional details of the interaction and functionality of magnets 75, pivot pin 80, and the positioning/rotational movement of transition plate 48 are described with particular reference to FIGS. 8 and 9 below.

Base mounts 72 each include one or more mounting apertures 76 that may be used to secure the assembled transition plate assembly 50 to automated checkout stand 10. In one embodiment, base mounts 72 may be fixedly secured, such as with screws or other suitable fasteners, to one of arches 13a, 13b of data capture device 11 (see FIG. 2) so that transition plate 48 extends across gap 18 between conveyor sections 14, 16. In other embodiments, base mounts 72 may be omitted and a flange (or other structure) similar to flange 74 may instead be integrally formed with, and extend from, one or both of arches 13a, 13b to provide a support surface for end cap 60 and transition plate 48.

FIG. 8 illustrates transition plate 48 in a break-away or release position. Such a configuration may be operable to provide an emergency stop mechanism for automated checkout system 10 when an item 20 or other debris becomes lodged or caught between leading conveyor section 14 and transition plate 48. With reference to FIG. 8, transition plate 48 may be detachably or movably supported/coupled to flange 74 by one or more magnets 75 that adjoin end caps 60 to flange 74. Magnet 75 may be positioned on end cap 60 and/or flange 74 to secure and retain transition plate 48 on flange 74 and provide a quick-release mechanism to remove transition plate 48 if necessary. Such a feature may be useful for a variety of purposes, such as for routine maintenance, cleaning, or repair of transition plate 48, and for accessing and removing collected debris off bottom data reader 40. In some embodiments, magnet 75 may be an electro-magnet that may be remotely powered on and off or in conjunction with another system of automated checkout system 10.

In some embodiments, the magnetic coupling arrangement may be used to activate and inactivate a shut-off mechanism 82 to control operation of the conveyor sections 14, 16. Shut-off mechanism 82 may include or operate in conjunction with one or more proximity and/or contact switches. In general, proximity and contact switches operate by sensing the presence or absence of an object. When the object contacts a switch (or the switch senses that an object is located within a predefined range), the switch may trigger the opening or closing of an electrical circuit to activate or inactivate a system that is tied to the switch. In automated checkout system 10, shut-off mechanism 82 may include one or more of such switches positioned near base mounts 72 or flange 74, which support end caps 60 and transition plate 48. In such an arrangement, shut-off mechanism 82 may be activated and deactivated by the movement or position of transition plate 48 in relation to the proximity switch.

For instance, when transition plate 48 is in an operative or seated position, that is, when transition plate 48 and end cap 60 are resting on flange 74, shut-off mechanism 82 may be in an inactive state (e.g., the proximity and/or contact switches sense the presence of transition plate 48). In such instances, automated checkout system 10 may be in an operational state with conveyor sections 14, 16 transporting item 20 across the read region of bottom data reader 40. However, when an item 20 or other obstruction dislodges or moves transition plate 48 to an inoperative or unseated position (e.g., transition plate 48 moves away from or loses contact with the proximity and/or contact switches), shut-off mechanism 82 activates and causes conveyor sections 14, 16 to stop.

With particular reference to FIG. 9, in an example operation, item 20 is placed on leading conveyor section 14 and transported across transition plate 48 generally in the direction of motion 34. As described previously, item 20 crosses transition plate 48, through which bottom data reader 40 attempts to read the optical code if present on bottom surface 32 of item 20 (data capture device 11 may simultaneously try to capture the optical code on the other surfaces of item 20). Typically, item 20 will move through automated checkout system 10 without any problems (i.e., without becoming lodged in gap 18).

However, in some instances, the item (shown as item 20' in dashed lines) may become trapped between leading conveyor section 14 and transition plate 48. In such instances, item 20' will exert a force on leading edge 56 of transition plate 48 as conveyor section 14 continues pushing item 20' toward transition plate 48. If item 20 is not dislodged (either on its own or manually by the user) the force on leading edge 56 may eventually overcome the coupling force of the one or more magnets 75 and cause transition plate 48 to break away from flange 74. Transition plate 48 may move or pivot upwardly (e.g., to a plate position illustrated by plate 48' shown in dashed lines) until pivot pin 80 arrests further movement of transition plate 48, or transition plate 48 may be entirely dislodged from flange 74 in embodiments without a pivot pin 80. In response to transition plate 48 losing contact with the flange 74 (or otherwise triggering the proximity sensor that may be placed in a different location), emergency shut-off mechanism 82 is activated, thereby triggering conveyor sections 14, 16 to come to a stop.

In some embodiments, instead of triggering conveyor sections 14, 16, shut-off mechanism 82 may send a message or signal to another device, such as a display screen or terminal that operates in conjunction with automated checkout stand 10, alerting the user that an item 20' may be lodged against transition plate 48. Upon receiving the message, the user may then decide whether to stop conveyor sections 14, 16 to determine whether any debris or other items 20' may be trapped.

Once conveyor sections 14, 16 have stopped, the user (e.g., customer 36, clerk 38, or other personnel) may remove trapped item(s) 20' and place item(s) 20' back on conveyor section 14 (or remove item(s) 20' for manual processing). Transition plate 48 may thereafter be repositioned on flange 74 and secured by the one or more magnets 75 to restart the process. In some embodiments, the process may restart automatically once transition plate 48 is repositioned on flange 74. In other embodiments, the system may need to be manually or remotely restarted after transition plate 48 has been repositioned.

In the unseated or breakaway position, pivot pin 80 may limit rotation of transition plate 48 and prevent transition plate 48 from dislodging entirely from flange 74 and potentially falling through gap 18 or from becoming scratched or otherwise damaged by trailing conveyor section 16. The range of motion of transition plate 48 is preferably kept to a minimum such that transition plate 48 does not interfere with trailing conveyor section 16. As described briefly, in some embodiments, pivot pin 80 may be omitted and transition plate 48 may simply fall away entirely from flange 74.

FIG. 10 illustrates an alternative embodiment of transition plate 48a that may be used with automated checkout stand 10. With reference to FIG. 10, transition plate 48a may include a body 84 made of plastic, glass, metal, or any other material (regardless of whether opaque or transparent). Transition plate 48a also includes a slit or opening 86 running along the length of body 84. Slit 86 may run along a central portion of transition plate 48a or it may be positioned closer to either leading edge 56 or trailing edge 58. In operation, data reader 40 captures the optical code on item 20 through slit 86 (and possibly through transition plate 48a when transition plate 48a is transparent) when item 20 crosses transition plate 48a.

In one embodiment, slit 86 has a width W of approximately 6 mm and transition plate 48a has a width of approximately 27 mm. In other embodiments, the width ranges for slit 86 and/or transition plate 48a may be selected as needed for a particular application or to accommodate desired specifications of data reader 40. Preferably, the dimensions and sizes of slit 86 are chosen to provide a sufficiently large read region to allow data reader 40 to accurately capture the optical code on item 20 as it crosses gap 18. Slit 86 is preferably sized to prevent items 20 from becoming lodged or falling through slotted aperture 86.

FIGS. 11-13 collectively illustrate an automated checkout stand 300 with a transition plate assembly 88 according to a second embodiment. In the following description, some components of automated checkout stand 300 may be referenced generally herein with the understanding that those components may have the same or similar features as the corresponding components described with reference to prior embodiments of automated checkout stand 10. In addition, description of other components of automated checkout stand 300 may be omitted to avoid obscuring more pertinent aspects of the embodiment.

With reference to FIG. 11, automated checkout stand 300 includes housing or counter structure 12, the vertically offset conveyor sections 14, 16 separated by gap 18, and data capture device 11 in similar arrangement as previously described. Counter structure 12 further includes a pair of railings 90 running alongside conveyor sections 14, 16, with each railing 90 having a recessed opening or slot 92 therein. Slot 92 is sized and dimensioned to receive a base mount 94 of transition plate assembly 88 (see FIGS. 12 and 13), which may be secured or attached within slot 92. Transition plate assembly 88 supports transition plate 48 across gap 18 in a similar fashion as described with reference to previous embodiments.

With particular reference to FIGS. 12 and 13, transition plate assembly 88 includes a mounting bracket 96 that may be formed as a unitary structure of base mount 94. Alternatively, mounting bracket 96 may be a separate component that is fastened, welded, riveted, or otherwise attached using suitable techniques to base mount 94. Mounting bracket 96 includes a flange 97 extending outwardly from base mount 94 and may be attached or otherwise positioned at an angle of between 10 and 20 degrees, preferably between 13 and 15 degrees, to support transition plate 48 in an angular orientation (similar to the embodiment described with reference to FIG. 3). Both base mount 94 and mounting bracket 96 are preferably constructed from steel or other magnetically active material. In some embodiments, only mounting bracket 96 may be constructed from a magnetically active material while base mount 94 may be magnetically active or non-magnetically active as desired.

Transition plate assembly 88 further includes a plate subassembly 98 including a transition plate 48 supported by pair of end caps 100. End cap 100 includes a slot 102 through which transition plate 48 is inserted and secured using glue or other adhesive material/substance. Alternatively, end cap 100 and transition plate 48 may be press fit or snap fit together without the use of any adhesives. In other embodiments, end cap 100 and transition plate 48 may be attached using other suitable fastening means, such as screws, pins, and bolts). End cap 100 further includes a pair of openings 104 sized to receive and secure one or more magnets 106. In a completed assembly, transition plate 48 is secured within end cap 100, and end cap 100 is magnetically secured to flange 97 via the one or more magnets 106. In this configuration, plate subassembly 98 remains fixed on flange 97 and may be dislodged by a sufficiently strong force bearing on transition plate 48 or end cap 100 to overcome the magnetic coupling of magnets 106 with flange 97.

As briefly mentioned previously, transition plate assembly 88 may be installed into automated checkout stand 300 by inserting transition plate assembly 88 into slot 92 on counter 12. Transition plate assembly 88 may be affixed to counter 12 via fastening apertures 108 on base mount 94, or may be otherwise attached using suitable means. When fully assembled and transition plate 48 is in the operative position, plate subassembly 98 rests on flange 97.

In example operation, similar to the prior embodiments, item 20 is transported on leading conveyor section 14 toward transition plate 48. Typically, item(s) 20 will transition on transition plate 48 without any problems. However, in some instances, item 20 may become trapped between leading conveyor section 14 and transition plate 48. If the item 20 is not dislodged (either on its own or manually by the user) the force on leading edge 56 may eventually overcome the coupling force of the one or more magnets 106 and dislodge end cap 100 of plate subassembly 98 partially or entirely off flange 97. In response to the end cap 100 losing contact with flange 97, a shut-off mechanism may be activated to trigger conveyor sections 14, 16 to come to a stop or send a message to the user as described previously. Automated checkout stand 300 may be deactivated until the obstruction is cleared and plate subassembly 98 is repositioned on flange 97.

FIGS. 14 and 15 collectively illustrate an automated checkout stand 400 with a transition plate assembly 110 according to a third embodiment. In the following description, some components of automated checkout stand 400 may be generally described herein with the understanding that those components may have the same or similar features as the corresponding components described with reference to prior embodiments. To avoid obscuring pertinent aspects of this embodiment, certain components of the automated checkout stand 400, such as the conveyors and the counter structure, have been removed from FIG. 14.

FIG. 14 is a view of automated checkout stand 400 with the conveyors and other features removed to illustrate a subassembly 112. For purposes of orientation, subassembly 112 forms a part of the interior components of automated checkout stand 400 and may be positioned beneath conveyor sections 14, 16. To establish a general frame of reference, in both FIGS. 11 and 14, transition plate 48 is illustrated in the same position in relation to data capture device 11.

With reference to FIG. 14, transition plate assembly 110 includes a pair of base mounts 114 each with a bracket 116 positioned on an upper end. Bracket 116 includes a horizontally-extending flange 118 and a perpendicular flange 120 that form a generally L-shaped structure. In some embodiments, bracket 116 may be integrally formed as a unitary structure of the base mount 114. Alternatively, bracket 116 may be fixedly attached, such as via welding, riveting, or other suitable means to base mount 114.

Transition plate assembly 110 further includes a plate subassembly 122 comprising transition plate 48 and an end cap 124. Plate subassembly 122 may be constructed similar to plate subassembly 98 described with reference to FIG. 12. For instance, transition plate 48 may be inserted through a slot 126 and adhered to end cap 124 with glue or other adhesive material/substance. In other embodiments, transition plate 48 and end cap 124 may be attached using other suitable fastening means, such as screws, nails, and bolts. Also similar to the embodiment described in FIG. 12, end cap 124 includes a pair of openings 128 sized to receive and secure one or more magnets 130. In a completed assembly, end cap 124 rests on the horizontally extending flange 118 and abuts the perpendicular flange 120, and is removably secured to flange 118 via the one or more magnets 130.

Transition plate assembly 110 may be installed into automated checkout stand 400 by positioning base mounts 114 on subassembly 112 in an area corresponding to the location of the gap that separates the offset conveyors so that transfer plate 48 is positioned between the gap. Base mounts 114 may be welded, riveted, or otherwise affixed to sub-assembly 112 via a flange 132. When fully assembled and transition plate 48 is in the operative position, plate subassembly 122, which includes transition plate 48 and end cap 124, is supported on bracket 116.

Transition plate assembly 110 described with reference to FIGS. 14 and 15 operates in the same or substantially similar fashion as described with respect to the previous embodiments. Briefly, transition plate subassembly 122 is in the operative position initially positioned between the conveyors and is secured via magnets 130. When an item 20 becomes lodged or trapped against plate subassembly 122, item 20 exerts force and dislodges plate subassembly 122 from bracket 116. In response to dislodging plate assembly 112, a shut-off mechanism may be activated to trigger conveyor sections 14, 16 to come to a stop or send a message to the user as described previously. Automated checkout stand 400 may be stopped until the obstruction is cleared and plate subassembly 122 is repositioned.

FIGS. 16-25 collectively illustrate an automated checkout stand 500 with a transition plate assembly 136 according to a fourth embodiment. In the following description, some components of automated checkout stand 500 may be generally described herein with the understanding that those components may have the same or similar features as the corresponding components described with reference to prior embodiments. In addition, description of some components of automated checkout stand 500 may be omitted altogether to avoid obscuring more pertinent aspects of the embodiment. For instance, in automated checkout stand 500, the counter structure and data capture device have been removed from FIG. 16. It should be understood that automated checkout stand 500 may include some of the components described in previous embodiments.

With reference to FIGS. 16 and 17, automated checkout stand 500 includes conveyor sections 14, 16 separated by a gap 18 in a similar arrangement as described in previous embodiments. Automated checkout stand 500 further includes a transition plate assembly 136 including a pair of base mounts 138 that support a plate subassembly 140 thereon. For convenience, plate subassembly 140 refers to the combination of transition plate 48 and a pair of end caps 142. Additional details relating to transition plate assembly 136, base mounts 138, and plate subassembly 140 are described below with reference to FIGS. 18-25. To avoid repetition, the following description proceeds with reference to one base mount 138 and one end cap 142. It should be understood that both base mounts 138 may be identical or substantially similar to each other and both end caps 142 may be identical or substantially similar to each other. Accordingly, any description of base mount 138 applies to both base mounts 138 and any description of end cap 142 applies to both end caps 142.

Figure 18:
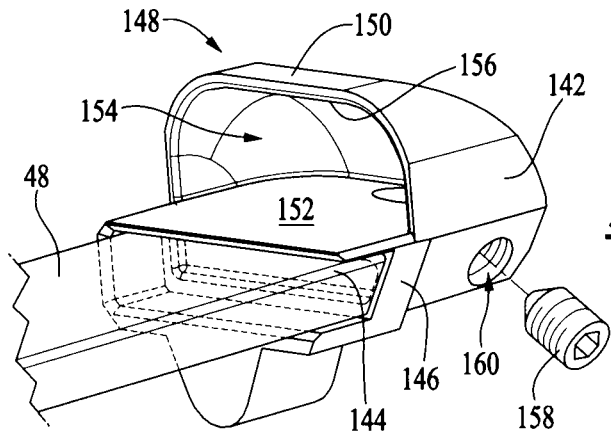
FIG. 18 is a perspective view of a portion of the transition plate assembly of FIG. 16 on an enlarged scale.

FIG. 18 illustrates an enlarged view of an end cap 142 of plate subassembly 140. With particular reference to FIG. 18, transition plate 48 is inserted into end cap 142 and secured using glue or other adhesive material/substance in a similar fashion as described in prior embodiments. Alternatively, end cap 142 and transition plate 48 may be press fit or snap fit together without the use of any adhesives. In some embodiments, a leading edge 144 of transition plate 48 may be exposed on a side surface 146 of end cap 142. This configuration allows transition plate 48 to be positioned closer to leading conveyor section 14 without having side surface 146 interfere with the operation of leading conveyor section 14. Minimizing the distance between transition plate 48 and leading conveyor section 14 may reduce the likelihood that an item (e.g., item 20) would get lodged between transition plate 48 and leading conveyor section 14. In addition, end cap 142 and transition plate 48 may further include a beveled leading edge 145 (FIG. 19) so that end cap 142 and transition plate 48 may be positioned closer to leading conveyor section 14 without interfering with the operation of leading conveyor section 14. In other embodiments, end cap 142 and transition plate 48 may also include a beveled trailing edge similar to leading edge 145 so that the trailing edge of end cap 142 may be positioned closer to trailing conveyor section 16 without interfering with trailing conveyor section 16.

In some embodiments, end cap 142 includes a lift handle 148 for simplifying the removal of plate subassembly 140 from base mounts 138 when desired (such as for maintenance or cleaning purposes). Lift handle 148 includes a crown 150 that extends from a top surface 152 of end cap 142 and partially encloses a cavity 154. Cavity 154 preferably opens toward transition plate 48 and is generally sized to support a user's hand or fingers. In an example operation, to remove plate subassembly 140, a user may insert a number fingers through cavity 154 and support them on an interior surface 156 of crown 150. Thereafter, the user may lift plate subassembly 140 off of base mounts 138 using lift handle 148. Preferably, lift handle 148 is integrally formed as a component of end cap 142. In other embodiments, lift handle 148 may be a separate component that is fastened, adhered, welded, or otherwise mounted using any suitable techniques.

Figure 24:
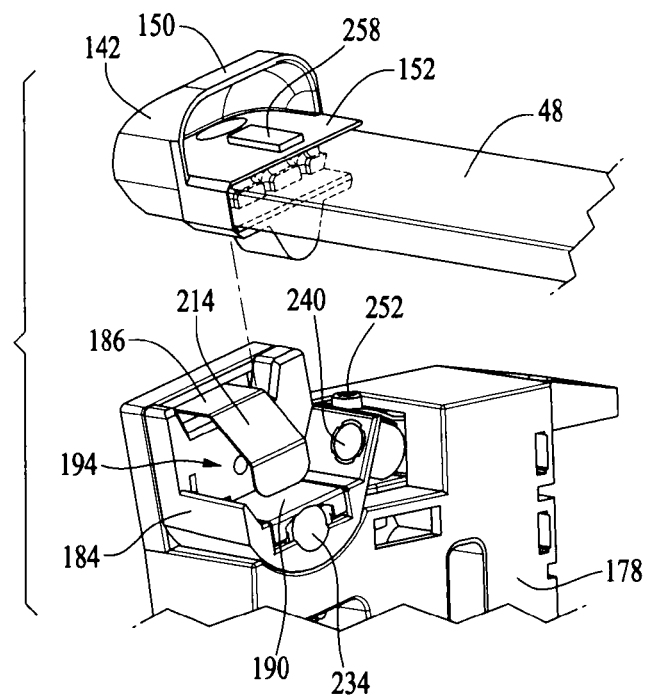
FIG. 24 is a partially exploded perspective view of the transition plate assembly of FIG. 16.

In some embodiments, end cap 142 further includes an adjustment set screw 158 positioned in a threaded bore 160 on side surface 146. Set screw 158 is made of a ferromagnetic material, such as iron, nickel, cobalt, or other such materials, and interacts with a magnet 240 on an end cap carrier 184 (FIG. 24). The interaction of set screw 158 with magnet 240 provides a horizontal magnetic force for helping retain end cap 142 on end cap carrier 184. The strength of the magnetic force correlates to the distance between set screw 158 and magnet 240. For instance, as set screw 158 is moved closer to magnet 240 (e.g., unscrewed from bore 160), the magnetic retention force increases. Similarly, as set screw 158 is moved away from magnet 240 (e.g., screwed into bore 160), the force decreases. Accordingly, set screw 158 can be manipulated to set the retaining force of the end cap 142 as desired. For instance, end cap 142 may be better secured to end cap carrier 184, by unscrewing set screw 158 to decrease the distance from magnet 240. Similarly, for a looser fit, set screw 158 may be screwed partially or entirely into bore 160 to increase the distance from magnet 240. Additional details of this interaction between set screw 158 and magnet 240 are described with relation to FIG. 24.

Figure 19:
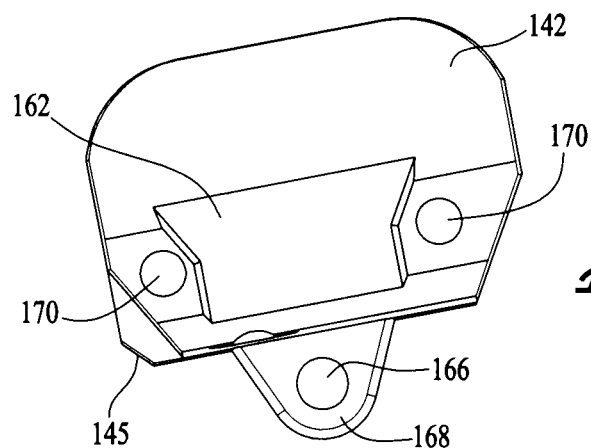
FIG. 19 is a rear view of an end cap of the transition plate assembly of FIG. 16.
Figure 20:
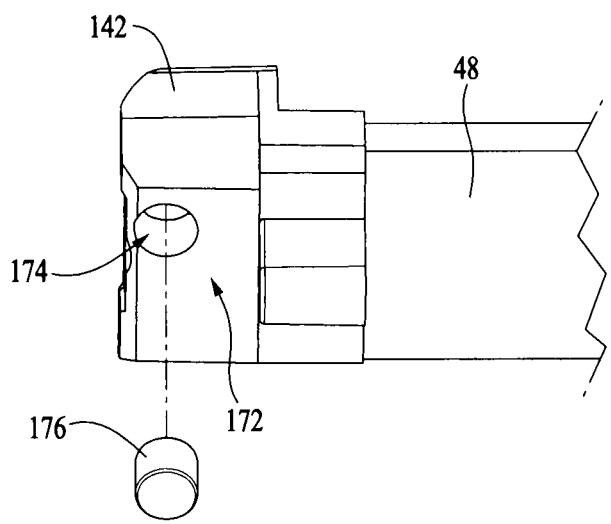
FIG. 20 is a bottom perspective view of the end cap of FIG. 19.

FIG. 19 is a rear view of end cap 142 and FIG. 20 is a bottom perspective view of end cap 142. Collectively, FIGS. 19 and 20 illustrate features for attaching end cap 142 onto end cap carrier 184. With reference to FIG. 19, end cap 142 includes a recessed mounting detent 162 that is keyed to mate with a centering spring 186 of end cap carrier 184 (FIG. 24) to hold end cap 142 in position. In some embodiments, mounting detent 162 and centering spring 186 may further include correlating keying features to provide a secondary retention mechanism. End cap 142 includes a switch magnet 166 positioned on a lower portion 168 and operable to trigger a proximity switch 234 when end cap 142 is dislodged from end cap carrier 184. Further details relating to mounting detent 162, centering spring 186, and proximity switch 234 are described with respect to FIG. 24. End cap 142 may optionally include one or more mounting holes 170 for optionally hard mounting (e.g., screwing or otherwise fastening) the end cap 142 to end cap carrier 184.

With reference to FIG. 20, a bottom surface 172 of end cap 142 includes a bore 174 sized to receive and secure a magnet 176. Magnet 176 may be press fit, adhered, or otherwise secured within bore 174. In one embodiment, bore 174 is a ⅛-inch bore to receive a similarly sized magnet 176. Alternatively, bore 174 and magnet 176 may be larger or smaller than ⅛ inches as desired. As described in further detail in relation to FIG. 24, end cap 142 is magnetically attached to end cap carrier 184 via interaction of magnet 176 with a magnetic clip 190 mounted to end cap carrier 184. Such magnetic attachment may provide a simple and convenient mechanism to secure plate subassembly 140 to end cap carrier 184 while also providing for easy removal of plate subassembly 140 when desired, such as for maintenance purposes.

Figure 21:
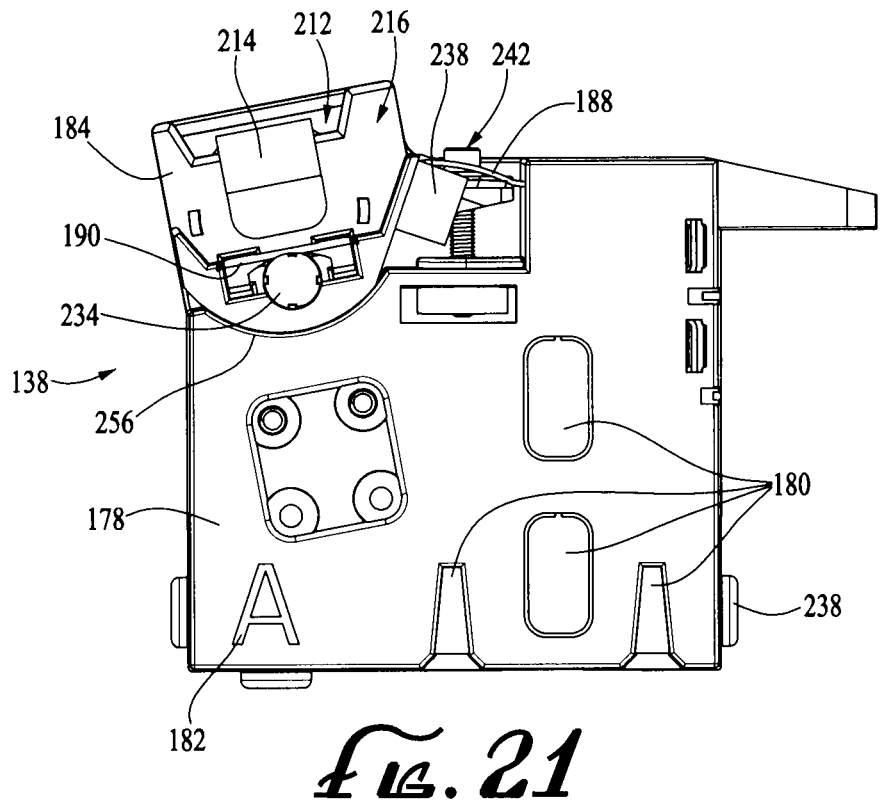
FIG. 21 is a front elevation view of a first mount of the transition plate assembly of FIG. 16.
Figure 22:
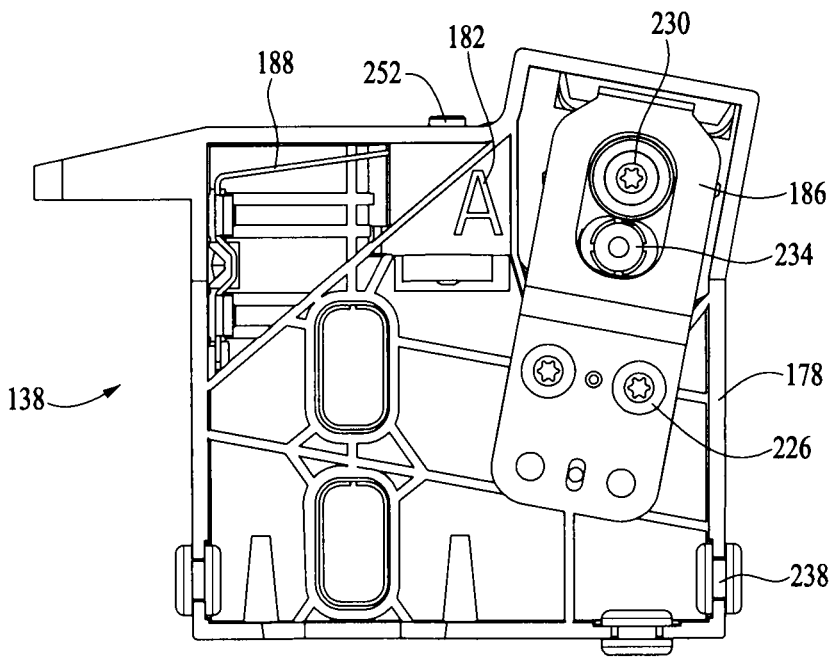
FIG. 22 is a rear elevation view of the mount of FIG. 21.
Figure 23:
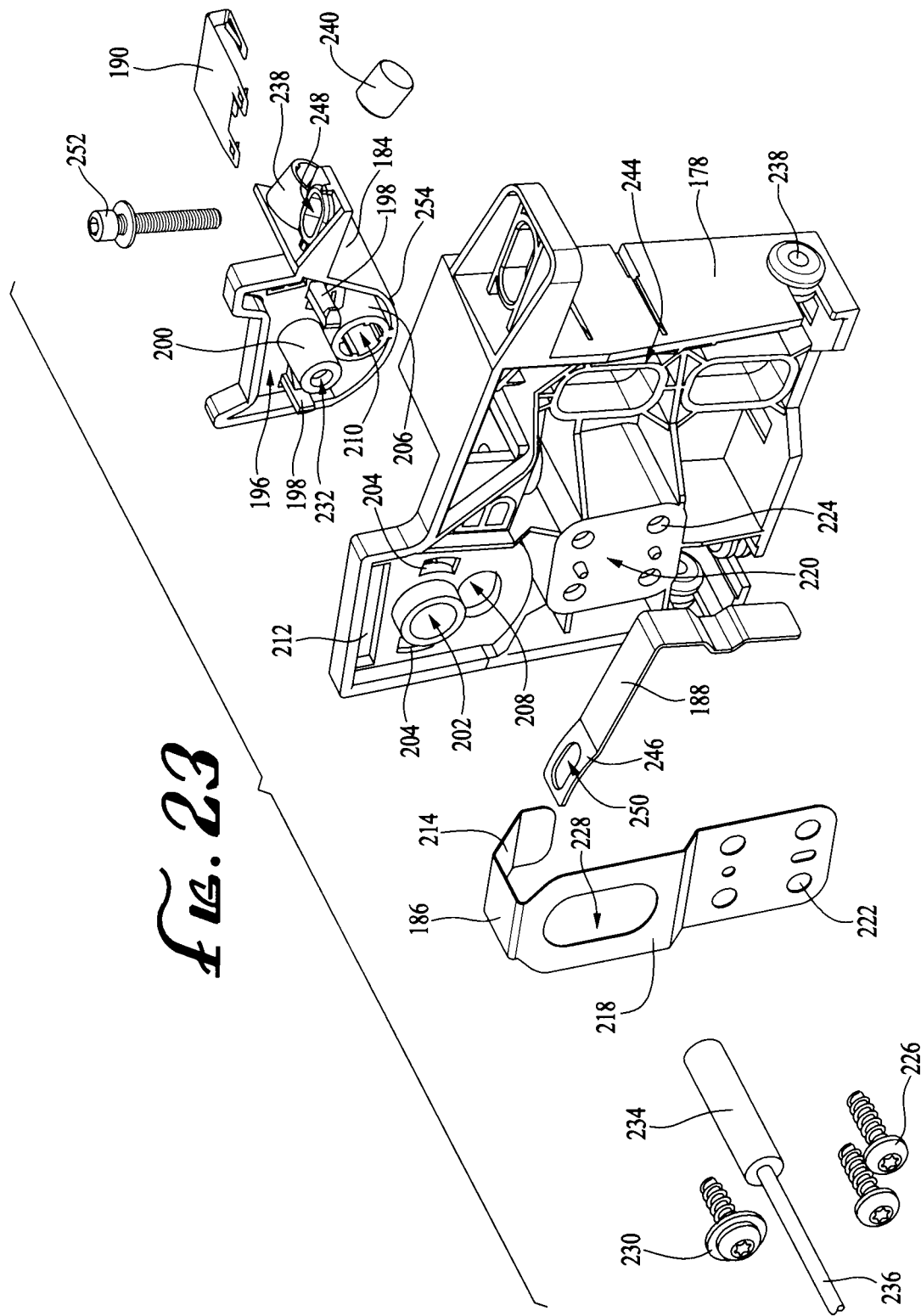
FIG. 23 is an exploded view of a second mount of the transition plate assembly of FIG. 16, which may be identical to the first mount of FIG. 21.

FIGS. 21-23 collectively illustrate various views of base mount 138. FIGS. 21 and 22 illustrate front and rear elevation views, respectively, of base mount 138. FIG. 23 illustrates an exploded view of base mount 138. With reference to FIGS. 21-23, the following discussion describes additional details of the components of base mount 138.

Base mount 138 includes a mounting bracket 178 having a number of slotted mounting features 180 for attaching mounting bracket 178 to counter structure 12 (FIG. 1) or another sub-structure of automated checkout stand 500. Mounting bracket 178 may include one or more marks 182 identifying each base mount 138 to ensure that the base mounts 138 are properly positioned prior to mounting to the automated checkout stand 500. Mounted bracket 178 may be made from a plastic material (e.g., a plastic injection molded part) to provide a lightweight, yet sturdy support structure for plate subassembly 140. In other embodiments, mounting bracket 178 may be made from metal components or other suitable materials.

With particular reference to FIGS. 23 and 24, mounting bracket 178 supports an end cap carrier 184, a pair of springs 186, 188, and a magnetic clip 190 that cooperate to support plate subassembly 140. Details relating to each of these components, along with an example assembly, is addressed in turn below. End cap carrier 184 includes a receiving surface 194 for receiving and supporting end cap 142, and a mounting surface 196 for mounting end cap carrier 184 onto mounting bracket 178. Mounting surface 196 includes a pair of prongs 198 and a boss 200, each of which extends generally perpendicularly from mounting surface 196. Prongs 198 and boss 200 may be used to securely attach end cap carrier 184 onto mounting bracket 178.

The following describes an example assembly for base mount 138. It should be understood that the base mount 138 may be assembled in a variety of ways and that the steps described below are not intended to establish a particular sequence of assembly. In one example assembly, boss 200 of end cap carrier 184 is inserted through a corresponding opening 202 of mounting bracket 178. As boss 200 is inserted through opening 202, prongs 198 enter through slots 204 of mounting bracket 178. Prongs 198 are pushed through slots 204 until prongs 198 snap into position to lock end cap carrier 184 in place. In this locked position, mounting surface 196 of end cap carrier 184 is flush (or substantially flush) against mounting bracket 178. In such a configuration, sleeve 206 of end cap carrier 184 is positioned against mounting bracket 178 such that an opening 208 of mounting bracket 178 aligns with a bore 210 on sleeve 206. In other embodiments, sleeve 206 may be partially or fully inserted through opening 208.

Once end cap carrier 184 is attached, a centering spring 186 is fitted through an opening 212 on mounting bracket 178. Centering spring 186 is preferably made of spring steel (but may be formed from other suitable material) that allows centering spring 186 to return to its original shape despite significant twisting or bending. Centering spring 186 preferably has at least six millimeters of spring travel. In other embodiments, centering spring 186 may have more or less than six-millimeter spring travel.

In an assembled configuration, an arm 214 of centering spring 186 extends from a front surface 216 of mounting bracket 178, and a mounting body 218 of centering spring 186 rests flush against a back surface 220 of mounting bracket 178. Mounting body 218 includes a plurality of mounting apertures 222 that correspond to apertures 224 for mounting centering spring 186 to mounting bracket 178 via screws 226. When centering spring 186 is mounted, a central slot 228 of mounting body 218 surrounds openings 202 and 208 of mounting bracket 178. A screw 230 may be inserted through opening 202 and through a central bore 232 of boss 200 to further secure both centering spring 186 and end cap carrier 184 to mounting bracket 178.

Base mount 138 further includes a proximity switch 234 that may be press fit and glued into sleeve 206 of end cap carrier 184. In some embodiments, proximity switch 234 may be inserted and secured into sleeve 206 after end cap carrier 184 has been mounted to mounting bracket 178 to avoid having wiring 236 of proximity switch 234 interfere with the assembly process of base mount 138. In some embodiments, base mount 138 may include a number of grommets 238 located on a periphery of base mount 138 to provide multiple routing paths for wiring 236 of proximity switch 234.

As is further described in detail with respect to FIG. 24, proximity switch 234 cooperates with magnet 166 on end cap 142 and detects any changes in the magnetic field generated by magnet 166. Such changes may be caused by magnet 166 moving away from proximity switch 234, such as when end cap 142 is dislodged from end cap carrier 184. When proximity switch 234 is triggered, that is, when end cap 142 is dislodged, proximity switch 234 may send a signal to a terminal or other display (not shown) alerting the user that the end cap 142 has been dislodged. The user may then investigate if the end cap 142 has been dislodged, which may result from an item 20 being lodged between transition plate 48 and leading conveyor section 14. In some embodiments, instead of sending a signal, proximity switch 234 may cause operation of conveyor sections 14, 16 to automatically stop when triggered. Such a configuration may be beneficial to prevent potential damage to transition plate assembly 136.

In some embodiments, end cap carrier 184 further includes a sleeve 238 sized for receiving a magnet 240 that may be press fit and adhesively secured therein. As described previously, when end cap 142 is seated on end cap carrier 184, magnet 240 interacts with set screw 158 on end cap 142 to help retain end cap 142 on end cap carrier 184.

End cap carrier 184 may further include an adjustment mechanism 242 for providing a desired adjustment to the angular configuration of transition plate 48. Similar to previous embodiments, transition plate 48 may be positioned between conveyor sections 14, 16 at a downward tilt angle ranging from between 10 and 20 degrees to optimize performance of data reader 40. However, in some embodiments, the optimal angle may differ depending on a variety of factors, such as the location of the data reader 40 in relation to conveyor sections 14, 16, or the width of gap 18, among other factors. Accordingly, adjustment mechanism 242 may be useful for adjusting the angle of transition plate 48.

With reference to FIGS. 21-23, adjustment mechanism 242 includes an adjustment spring 188 that is fitted onto an elongated slit 244 of mounting bracket 178 (FIG. 23). Adjustment spring 188 includes a head portion 246 that extends over a corresponding bore 248 on end cap carrier 184. Head portion 246 includes a slot 250 that aligns with bore 248 when adjustment spring 188 is mounted to mounting bracket 178. Bore 248 is threaded and sized to receive an adjustment screw 252 with matching threads. In an assembled configuration, adjustment screw 252 is inserted through slot 250 of adjustment spring 188 and screwed into bore 248.

With particular reference to FIGS. 21 and 23, end cap carrier 184 may include a curved lower surface 254 that rides against a corresponding curved surface 256 of mounting bracket 178 to provide rotational movement. Screwing or unscrewing of adjustment screw 252 urges rotational movement of lower surface 254 of end cap carrier 184 against curved surface 256. Since transition plate 48 is fixed on end cap 142, and end cap 142 is fixed on end cap carrier 184, rotation of end cap carrier 184 causes rotation of transition plate 48.

In some embodiments, transition plate 48 may be set at a nominal angle of 10 degrees (e.g., a nominal angle $\alpha$ shown in FIG. 3). Adjustment mechanism 242 may provide a range of adjustability to the nominal angle $\alpha$ of ±7 degrees to provide a sufficient range for various configurations of automated checkout stand 500. In other embodiments, the nominal angle may be 14 degrees and the range of adjustability may be ±10 degrees. It should be understood that the degrees provided for the nominal angle and range of adjustability are examples provided for illustration purposes. Accordingly, in other embodiments, the nominal angle and the range of adjustability may be different than the values provided. Preferably, the range of adjustability is relatively small to avoid the possibility that the transition plate assembly 136 could be angled in such fashion that it causes interference with the operation of the leading conveyor section 14.

With reference to FIG. 24, in some embodiments, automated checkout stand 500 may further include a level mechanism 258 for ensuring that both end cap carriers 184 are set to substantially equal angles via adjustment mechanism 242. Unequal adjustment may lead to unwanted issues, such as inefficiencies of the data reader 40 or damage of the transfer plate 48, among other issues. In some embodiments, level mechanism 258 may be screwed, fastened, or otherwise rigidly mounted to magnetic clip 190, or to end cap 142, such as on crown 150 or along interior surface 152. In other embodiments, level mechanism 258 may include a magnet (not shown) and could be removably attached to magnetic clip 190 or to end cap 142 on interior surface 152 to measure the angular adjustments of transition plate assembly 136. Once the desired orientation is configured, level mechanism 258 may be removed and stored for later use.

With particular reference to FIG. 24, the following description relates to an example mounting arrangement of plate subassembly 140 to end cap carrier 184. In one embodiment, end cap 142 is moved toward arm 214 of centering spring 186. Centering spring 186 engages mounting detent 162 to hold end cap 142 in position and center end cap 142 on end cap carrier 184. Once centering spring 186 and mounting detent 162 are properly engaged, end cap 142 is moved downward toward a magnetic clip 190 and seated thereon. When seated, magnet 176 on end cap 142 magnetically attaches to magnetic clip 190 to retain end cap 142 on end cap carrier 184. In this configuration, magnet 166 (FIG. 19) is aligned with proximity switch 234. If desired, adjustment screw 252 may be used to change the nominal angle of the transition plate 48. In addition, set screw 158 (FIG. 18) may be screwed or unscrewed to increase or decrease the magnetic retention force holding end cap 142 in position. If desired, level mechanism 258 may be monitored to ensure that both end caps 142 have been adjusted substantially equally.

In an example operation, an item 20 is placed on leading conveyor section 14 and transported across transition plate 48 generally in the direction of motion 34. As described previously, as the item 20 crosses transition plate 48, the bottom data reader 40 attempts to read the optical code on a bottom surface 32 of item 20. Typically, item 20 will move through automated checkout system 500 without any problems (i.e., without becoming lodged in gap 18).

However, in some instances, the item 20 may become trapped between leading conveyor section 14 and transition plate 48. In such instances, item 20 will exert a force on leading edge 144 of transition plate 48 as conveyor section 14 continues pushing item 20 toward transition plate 48. If item 20 is not dislodged (either on its own or manually by the user) the force on leading edge 144 may eventually move or dislodge end cap 142. Once end cap 142 moves beyond a predetermined acceptable range, the movement of magnet 166 triggers proximity switch 234. In response, proximity switch 234 sends a signal alerting a user that the end cap 142 has moved beyond the acceptable range. The user may then investigate whether there is an item 20 lodged against transition plate 48. If so, the user may decide to stop operation of the conveyor sections 14, 16 and remove the item 20.

Figure 25:
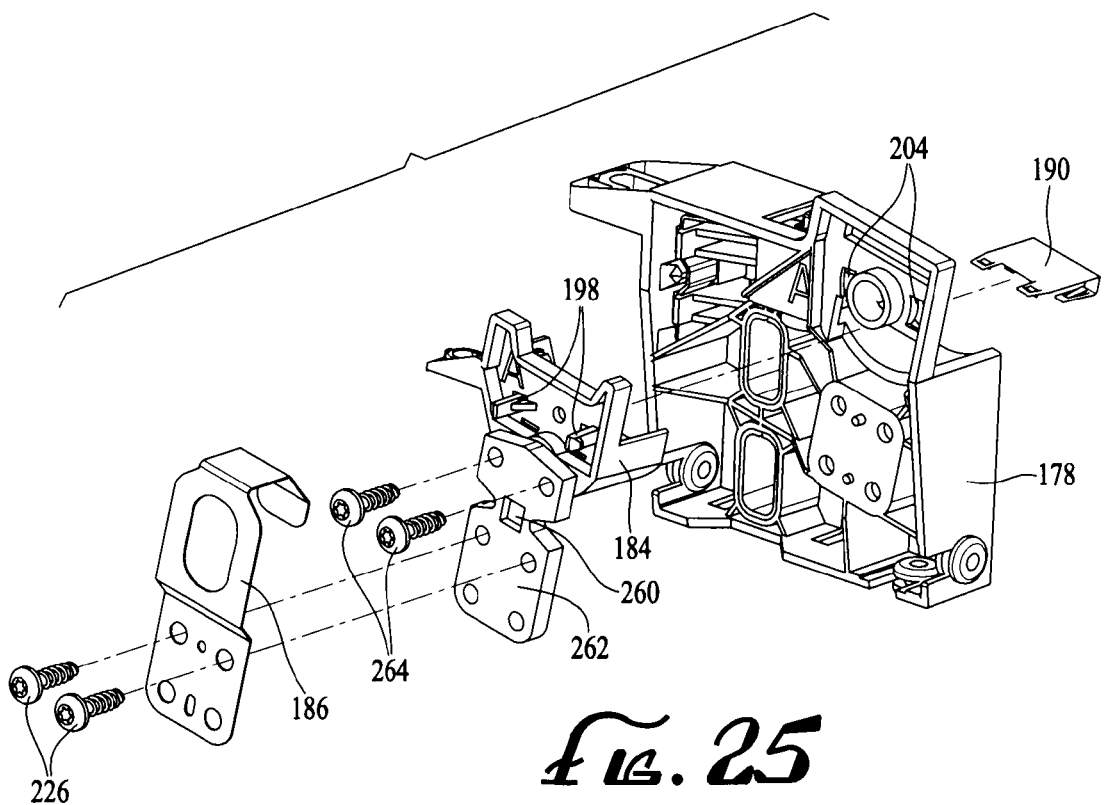
FIG. 25 is an exploded view of an alternate embodiment of the mount of FIG. 21.

FIG. 25 illustrates an exploded view of an alternate embodiment of base mount 138, and in particular, an alternate embodiment of end cap carrier 184. In the illustrated view, end cap carrier 184 is exploded out of order to show pertinent aspects of the embodiment. For clarity purposes, end cap carrier 184 snaps into base mount 138 via prongs 198 and slots 204 in a similar fashion as described with relation to FIG. 23. With reference to FIG. 25, end cap carrier 184 includes a strain gauge 260 for measuring loads placed upon transition plate 48 and/or end caps 142. In such embodiments, mounting bracket 178 may include end cap carrier 184, centering spring 186, adjustment spring 188, and other components arranged in a similar fashion as described in FIGS. 17-24. In this alternate embodiment, however, end cap carrier 184 is rigidly mounted to mounting bracket 178 via screws 226. In addition, end cap carrier 184 supports a strain gauge 260 configured for measuring loads on transition plate assembly 136.

In one embodiment, strain gauge 260 is adhesively secured to a plate 262, which in turn is screwed or otherwise fastened to end cap carrier 184 via screws 264. When a load is placed on the transition plate 48 or end caps 142, the load may be measured by strain gauge 260. In some embodiments, electronics (which may be housed in or on base mounts 138 or elsewhere in counter structure 12) and software may be used to monitor an output signal of strain gauge 260 and discern between standard strain readings and strain readings that suggest an emergency situation.

For instance, strain having short duration or low magnitude may be ignored as being caused by items 20 simply transitioning over transition plate 48. However, a constant load over a long period of time or a load with increasing magnitude may be a potential emergency situation. In such instance, the software may trigger stoppage of the conveyor sections 14, 16 or may send a signal to a separate point-of-sale terminal or display alerting the user of the potential danger.

Although the description above contains much specificity, these details should not be construed as limiting the scope of the invention, but as merely providing illustrations of some embodiments of the invention. It should be understood that subject matter disclosed in one portion herein can be combined with the subject matter of one or more of other portions herein as long as such combinations are not mutually exclusive or inoperable.

The terms and descriptions used above are set forth by way of illustration only and are not meant as limitations. Those skilled in the art will recognize that many variations can be made to the details of the above-described embodiments without departing from the underlying principles of the invention. The scope of the present invention should, therefore, be determined only by the following claims.

The invention claimed is:

1. An automated checkout system for reading encoded data on a bottom surface of an item, the automated checkout system comprising:
   a housing;
   a conveyor system operable to receive and transport the item bearing encoded data along a direction of motion and including a leading conveyor section and a trailing conveyor section separated by a gap;
   a transition element assembly positioned across the gap, the assembly further comprising:
      a base mount coupled to the housing, the base mount including an end cap carrier;
      an elongated transition plate having an end cap with a slot, wherein a portion of the transition plate is inserted through the slot of the end cap to support the elongated transition plate, and wherein the end cap is movably coupled to the end cap carrier and is movable between a first position and a second position;
      a trigger magnet carried by one or both of the end cap and the end cap carrier; and
      a sensor in communication with the trigger magnet, the trigger magnet configured to trigger the sensor in response to movement of the end cap from the first position to the second position.

2. The automated checkout system of claim 1, further comprising a mounting detent formed on a back end of the end cap, the mounting detent keyed to mate with the end cap carrier.

3. The automated checkout system of claim 2, further comprising a centering spring supported on the end cap carrier, the centering spring keyed to the mounting detent for receiving and supporting the end cap.

4. The automated checkout system of claim 1, wherein the sensor comprises a magnetic proximity switch.

5. The automated checkout system of claim 1, further comprising:
   a retaining magnet carried by the support structure; and
   a magnetic clip supported on the base mount, wherein the retaining magnet interacts with the magnetic clip to couple the support structure to the base mount.

6. The automated checkout system of claim 1, further comprising:
   a threaded bore formed on the end cap;
   an adjustment spring supported on the end cap carrier, the adjustment spring having an aperture aligned with the threaded bore;
   a set screw positioned in the threaded bore through the aperture of the adjustment spring, the set screw movable relative to the threaded bore; and
   a magnet supported on the end cap carrier,
   wherein the set screw and the magnet generate a magnetic retention force to magnetically retain the end cap on the end cap carrier, and wherein movement of the set screw within the threaded bore alters the magnetic retention force.

7. The automated checkout system of claim 1, further comprising a strain gauge connected to the support structure for measuring strain exerted on transition plate.

8. An automated checkout system for reading encoded data on a bottom surface of an item, the automated checkout system comprising:
   a housing;
   a conveyor system operable to receive and transport the item bearing encoded data along a direction of motion and including a leading conveyor section and a trailing conveyor section separated by a gap;

a transition element disposed across at least a portion of the gap between the leading and trailing conveyor sections for helping the item transition between the leading conveyor and the trailing conveyor sections, the transition element movably supported on a support structure coupled to the housing, wherein the transition element is movable between a first position and a second position;

an adjustment mechanism coupled to the support structure, wherein actuation of the adjustment mechanism adjusts a position of the transition element relative to the support structure; and a sensor in communication with the transition element, wherein the sensor is triggered in response to movement of the transition element from the first position to the second position.

9. The automated checkout system of claim 8, wherein the adjustment mechanism further includes an adjustment screw inserted through a slot of the support structure, wherein rotation of the adjustment screw within the slot adjusts a position of the transition element relative to the support structure.

10. The automated checkout system of claim 8, wherein the leading conveyor section is vertically offset from the trailing conveyor, and wherein the transition element is supported on the support structure at an angled configuration from the leading conveyor section toward the trailing conveyor section such that the item slides across the transition element when transitioning between the leading and trailing conveyor sections.

11. The automated checkout system of claim 8, wherein the transition element comprises a transparent material, the automated checkout system further comprising:

a data reading device positioned within the housing beneath the leading and trailing conveyor sections, the data reading device configured to read the optical code on the bottom surface of the item through the transition element as the item is transported across the transition element.

12. The automated checkout system of claim 8, further comprising:

a data reading device positioned within the housing beneath the leading and trailing conveyor sections, the data reading device configured to read the optical code on the bottom surface of the item through the transition element as the item moves across the transition element, and wherein the transition element further includes an aperture through which the data reading device is configured to read the optical code on the bottom surface of the item.

13. The automated checkout system of claim 8, wherein the transition element includes an end cap coupled to an end of the transition element, and wherein the support structure comprises a mounting plate coupled to an inner wall of the housing structure, the mounting plate including a flange extending outwardly therefrom for supporting the end cap and the transition element.

14. The automated checkout system of claim 13, further comprising:

one or more magnets positioned on the end cap, the one or more magnets operable to magnetically couple the end cap to the flange.

15. The automated checkout system of claim 8, further comprising:

a shut-off mechanism in communication with the sensor, wherein, when the sensor is triggered, the shut-off mechanism is activated and automatically stops operation of the conveyor system.

16. The automated checkout system of claim 8, wherein the transition element is rotatably supported on the support structure of the housing, and wherein the transition element is rotatable between the first and second positions.

17. The automated checkout system of claim 16, further comprising a pivoting connector connecting the transition element to the support structure, the pivoting connector configured for limiting a rotational range of motion of the transition element between the first and second positions.

18. An automated checkout system for reading encoded data on a bottom surface of an item, the automated checkout system comprising:

a housing;

a conveyor system operable to receive and transport the item bearing encoded data along a direction of motion and including a leading conveyor section and a trailing conveyor section separated by a gap;

a transition element assembly positioned across the gap, the assembly further comprising:

a base mount coupled to the housing;

an elongated transition plate carried by a support structure wherein the support structure is movably coupled to the base mount and is movable between a first position and a second position;

a trigger magnet carried by the support structure; and a sensor in communication with the trigger magnet, the trigger magnet configured to trigger the sensor in response to movement of the support structure from the first position to the second position; and an adjustment mechanism coupled to the support structure base mount, the adjustment mechanism configured to adjust an angular configuration of the elongated transition plate.

* * * * *

UNITED STATES PATENT AND TRADEMARK OFFICE
CERTIFICATE OF CORRECTION

| | | |
|---|---|---|
| PATENT NO. | : 8,997,972 B2 | Page 1 of 1 |
| APPLICATION NO. | : 13/834408 | |
| DATED | : April 7, 2015 | |
| INVENTOR(S) | : Stepan Ryabinin et al. | |

It is certified that error appears in the above-identified patent and that said Letters Patent is hereby corrected as shown below:

In the Specification

In column 3, line 13, replace "alternate embodiment" with --alternative embodiment--.

In column 5, line 3, replace "alternate configurations" with --alternative configurations--.

In column 5, line 10, replace "conveyor section 14, 16" with --conveyor sections 14, 16--.

In column 7, line 45, replace "further includes a sleeve" with --further include a sleeve--.

In column 13, line 11, replace "a number fingers" with --a number of fingers--.

In column 14, line 30, replace "is addressed in turn" with --are addressed in turn--.

In column 17, line 19, replace "view of an alternate" with --view of an alternative--.

In column 17, lines 20-21, replace "an alternate embodiment" with --an alternative embodiment--.

In column 17, line 32, replace "In this alternate embodiment" with --In this alternative embodiment--.

In the Claims

In column 18, line 61, claim 7, replace "on transition plate" with --on the transition plate--.

Signed and Sealed this
Fourteenth Day of July, 2015

Michelle K. Lee
*Director of the United States Patent and Trademark Office*